United States Patent
Kim et al.

(10) Patent No.: US 9,542,565 B2
(45) Date of Patent: Jan. 10, 2017

(54) DISPLAY DEVICE AND METHOD FOR CONTROLLING THE SAME

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 14/504,135

(22) Filed: Oct. 1, 2014

(65) Prior Publication Data
US 2016/0026812 A1    Jan. 28, 2016

(30) Foreign Application Priority Data
Jul. 22, 2014    (KR) .................... 10-2014-0092443

(51) Int. Cl.
| | |
|---|---|
| G06F 21/62 | (2013.01) |
| G06F 3/01 | (2006.01) |
| G06F 9/44 | (2006.01) |
| G06F 3/0488 | (2013.01) |
| G06F 21/84 | (2013.01) |

(52) U.S. Cl.
CPC .......... *G06F 21/6209* (2013.01); *G06F 3/013* (2013.01); *G06F 3/017* (2013.01); *G06F 3/04886* (2013.01); *G06F 9/4445* (2013.01); *G06F 21/62* (2013.01); *G06F 21/84* (2013.01); *G06F 2203/0382* (2013.01); *G06F 2203/04803* (2013.01)

(58) Field of Classification Search
None
See application file for complete search history.

(56) References Cited

U.S. PATENT DOCUMENTS

| | | |
|---|---|---|
| 8,230,355 B1 | 7/2012 | Bauermeister et al. |
| 8,451,216 B2 | 5/2013 | Sakata et al. |
| 8,510,381 B1 | 8/2013 | Birand et al. |
| 2001/0054143 A1* | 12/2001 | Miyazawa .............. G06F 21/31 713/155 |

(Continued)

FOREIGN PATENT DOCUMENTS

WO    WO 2014/066352 A1    5/2014

OTHER PUBLICATIONS

Izadi et al., "Dynamo: A public interactive surface supporting the cooperative sharing and exchange of media", UIST, 2003, pp. 159-168.

(Continued)

*Primary Examiner* — Hadi Armouche
*Assistant Examiner* — Malcolm Cribbs
(74) *Attorney, Agent, or Firm* — Birch, Stewart, Kolasch & Birch, LLP

(57) ABSTRACT

A display device and a method for controlling the same are disclosed. The method for controlling a display device comprises the steps of displaying a control object in a first private region; moving the displayed control object from the first private region to a public region; moving the control object based on a first moving mode if an object property of the control object is a private property; and moving the control object based on a second moving mode if the object property of the control object is a public property. In this case, the first moving mode may have a moving property of the control object, which is different from that of the second moving mode.

19 Claims, 21 Drawing Sheets

(56) References Cited

U.S. PATENT DOCUMENTS

| | | | | |
|---|---|---|---|---|
| 2006/0236250 A1* | 10/2006 | Gargi | G06F 21/84 | 715/753 |
| 2007/0061567 A1* | 3/2007 | Day | H04L 63/123 | 713/159 |
| 2008/0229184 A1* | 9/2008 | Prish | G06F 17/246 | 715/212 |
| 2009/0141895 A1* | 6/2009 | Anderson | G06F 21/84 | 380/252 |
| 2009/0273562 A1* | 11/2009 | Baliga | G06F 3/013 | 345/157 |
| 2010/0082679 A1* | 4/2010 | Ekberg | G06F 21/6218 | 707/783 |
| 2010/0107219 A1* | 4/2010 | Thompson | G06F 21/6218 | 726/2 |
| 2011/0239306 A1* | 9/2011 | Avni | G06F 21/54 | 726/26 |
| 2011/0321143 A1* | 12/2011 | Angaluri | H04N 9/3194 | 726/6 |
| 2012/0154255 A1* | 6/2012 | Hinckley | H04N 7/142 | 345/1.3 |
| 2012/0166997 A1* | 6/2012 | Cho | G06F 21/6218 | 715/778 |
| 2012/0167197 A1* | 6/2012 | Kruger | G06F 12/00 | 726/16 |
| 2012/0174020 A1 | 7/2012 | Bell et al. | | |
| 2012/0311657 A1* | 12/2012 | Boldyrev | H04W 12/02 | 726/1 |
| 2014/0164934 A1* | 6/2014 | Yang | G06F 17/3089 | 715/738 |
| 2014/0215356 A1* | 7/2014 | Brander | H04L 67/36 | 715/753 |
| 2014/0281482 A1* | 9/2014 | Diamond | H04L 63/061 | 713/151 |
| 2014/0289872 A1* | 9/2014 | Mun | G06F 21/6245 | 726/30 |
| 2014/0298478 A1* | 10/2014 | Kim | G06F 3/0488 | 726/26 |
| 2014/0365923 A1* | 12/2014 | Lee | G06F 3/017 | 715/758 |
| 2015/0106740 A1* | 4/2015 | Tan | G06F 3/0484 | 715/750 |
| 2015/0278534 A1* | 10/2015 | Thiyagarajan | G06F 21/62 | 726/28 |

OTHER PUBLICATIONS

Vogel et al., "Interactive Public Ambient Displays: Transitioning from Implicit to Explicit, Public to Personal, Interaction with Multiple Users", UIST, Oct. 24-27, 2004, 10 pages.

* cited by examiner

DISPLAY DEVICE AND METHOD FOR CONTROLLING THE SAME

This application claims the benefit of the Korean Patent Application No. 10-2014-0092443, filed on Jul. 22, 2014, which is hereby incorporated by reference as if fully set forth herein.

BACKGROUND OF THE INVENTION

Field of Invention

The present specification relates to a display device and a method for controlling the same.

Discussion of the Related Art

Recently, enlargement and light weight of a display device have been accelerated. Also, a thickness of the display device has been gradually thinned in accordance with miniaturization of parts. With this trend, a wall-hanging type TV has been popularized. Also, an enlarged display device has detected an input of a user, and has performed an operation on the basis of the detected input. This interactive enlarged display device may be used as a device that interacts with a user in various places such as an exhibition center, a theater, a fashion store, an information desk, a restaurant, a hotel lobby, and a gallery. Also, it seems that the trend towards enlargement and light weight of the display device will continue in the future. Accordingly, it seems that use of an enlarged display which is interactive with a user will be increased rapidly.

The enlarged display device may be used by a plurality of users. In more detail, the enlarged display device may have a size enough to be used by a plurality of users. At this time, the display device used by a plurality of users needs to identify use regions for the respective users from each other. Also, it is required to restrict or identify some use regions of the enlarged display device by considering features of the users or features of a public region. Accordingly, the need of a method for identifying and controlling use regions among a plurality of users in an enlarged display device has been required.

SUMMARY OF THE INVENTION

Accordingly, the present specification is directed to a display device and a method for controlling the same, which substantially obviate one or more problems due to limitations and disadvantages of the related art.

An object of the present specification is to provide a display device that provides a display unit which includes a private region and a public region.

Another object of the present specification is to provide a method for setting a moving mode differently on the basis of an object property of a control object if a display device moves the control object from a private region to a public region.

Still another object of the present specification is to provide a display device that provides a display unit which further includes a buffer region.

Further still another object of the present specification is to provide a method for displaying a control indicator corresponding to a control object.

Further still another object of the present specification is to provide a method for detecting a location of eyes of a user by using a camera unit and setting a private region and a public region based on the location of the eyes of the user.

Further still another object of the present specification is to provide a method for displaying a control object based on a distance between a display device and a user.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device according to one embodiment comprises a display unit configured to display visual information, wherein the display unit includes a private region and a public region; a control input sensing unit configured to detect a control input and to deliver the detected control input to a processor; and the processor configured to control the display unit and the control input sensing unit. In this case, the processor displays a control object in a first private region, and when the displayed control object is moved from the first private region to the public region, moves the control object based on a first moving mode if an object property of the control object is a private property, and moves the control object based on a second moving mode if the object property of the control object is a public property, wherein the first moving mode is different from the moving property of the second moving mode.

In another aspect of the present specification, a method for controlling a display device comprises the steps of displaying a control object in a first private region, moving the displayed control object from the first private region to a public region; moving the control object based on a first moving mode if an object property of the control object is a private property; and moving the control object based on a second moving mode if the object property of the control object is a public property. In this case, the first moving mode is different from the moving property of the second moving mode.

According to the present specification, the display device and the method for controlling the same may be provided.

Also, according to the present specification, the display device may provide a display unit which includes a private region and a public region.

Also, according to the present specification, the display device may set a moving mode differently based on an object property of a control object if it moves the control object from a private region to a public region.

Also, according to the present specification, the display device may provide a display unit which further includes a buffer region.

Also, according to the present specification, the display device may display a control indicator corresponding to a control object.

Also, according to the present specification, the display device may set detect eyes of a user by using a camera unit and set a private region and a public region based on a location of the eyes of the user.

Also, the display device may display a control object based on a distance with a user.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the embodiments of the present invention will be described in detail with reference to the accompanying drawings and the disclosure described by the drawings, it is to be understood that the present invention is not limited by such embodiments.

Although the terms used in the present specification are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Although the terms such as "first" and/or "second" in this specification may be used to describe various elements, it is to be understood that the elements are not limited by such terms. The terms may be used to identify one element from another element. For example, a first element may be referred to as a second element or vice versa within the range that departs from the scope according to a concept of the present specification.

Also, in the specification, when a module "includes" an element, it means that the module may further include another element unless otherwise specified. The suffixes " . . . unit" and " . . . module" for the elements used in the specification are given or used to mean a unit for processing at least one function or operation, and may be implemented by combination of hardware and/or software.

Figure 1:
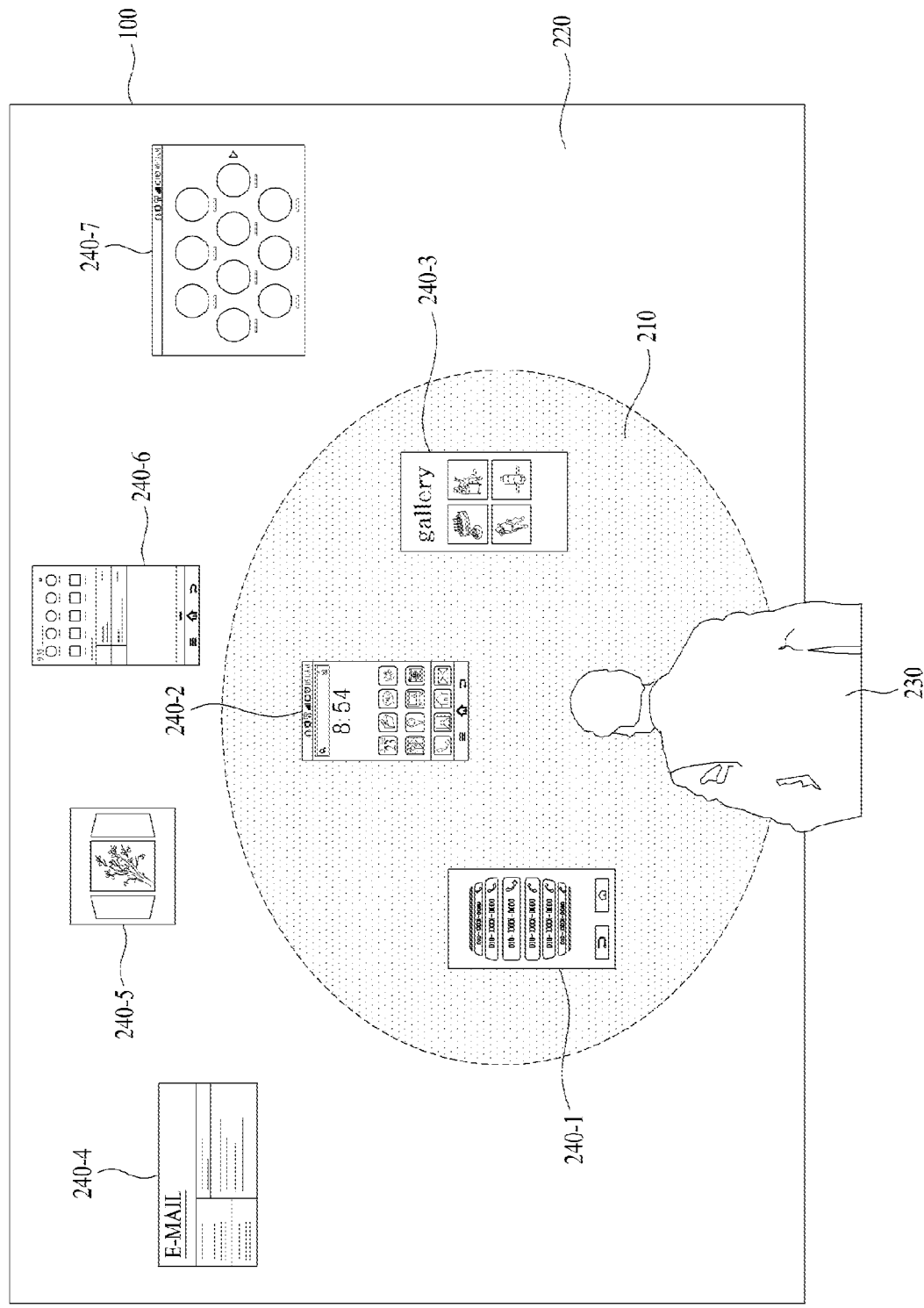
FIG. 1 is a diagram illustrating a display device that includes a private region and a public region in accordance with one embodiment of the present specification.

FIG. 1 is a diagram illustrating a display device that includes a private region and a public region in accordance with one embodiment of the present specification. The display device 100 may be an enlarged display device or a wall display device. At this time, the enlarged display device may be a device that includes a large display region that may be used by a plurality of users. Also, the wall display device may be a display device that is used by being built in a wall or other attachable location. For example, the wall display device may be used by being built in various places such as an exhibition center, a theater, a fashion store, an information desk, a restaurant, a hotel lobby, and a gallery. Also, the wall display device may be an enlarged display device built in a wall, and may be used by a plurality of users. In other words, the display device 100 disclosed in this specification may be a device that includes a large display region that may be used by a plurality of users. However, in accordance with one embodiment of the present specification, the display device 100 is a device that includes a plurality of regions even in the case that the display device 100 has a small size, and if the display device 100 includes a private region and a public region, the present invention may equally be applied to the display device, and the display device 100 is not limited to the aforementioned embodiment.

The display device 100 may include a private region 210 and a public region 220. At this time, the private region may be a region set based on a user. In more detail, the private region may be a region of a display unit 110 of the display device 100, wherein the region may be used by a specific user 230 only. At this time, the private region 210 may be a region where an access authority is limited based on a user. For example, if a first user uses the display device 100, the display device 100 may set a first private region based on the first user. Also, if a second user uses the display device 100, the display device 100 may set a second private region based on the second user. Also, for example, the private region 210 may be set based on a security level set by a user or a processor 150. At this time, the security level may be set differently depending on a user who is authorized or not. In other words, the private region 210 may be set based on the user, and is not limited to the aforementioned embodiment. The public region 220 may be a region accessed to all the users who use the display device 100. In more detail, the display device 100 may set a region of the display unit 110, which is not the private region 210, as a public region. For example, an object located in the public region 220 may be used by all the users. In other words, the public region 220 may be a region that may be used by all the users. If the display device 100 set the private region 210 and the public region 220, the display device 100 may detect a user and set the private region 210 based on the user. In more detail, the display device 100 may detect a user by using at least one of a camera unit 130 and a sensor unit 140. At this time, for example, the display device 100 may detect a location of eyes of the user by using at least one of the camera unit 130 and the sensor unit 140. At this time, the display device 100 may set a region within a first distance from the detected location of eyes of the user as the private region 210. At this time, the first distance may be a region set by the user or the processor 150. Alto, for example, the display device 100 may further detect an arm length of the user by using the camera unit 130 and the sensor unit 140, and may set the first distance based on the arm length of the user. In other words, the display device 100 may set the private region 210 by considering the region that may be used by the user. Also, for example, the display device 100 may detect a location of the display unit 110, which corresponds to at least one of a face center and a body center of the user. At this time, the display device 100 may set a region with the first distance from the corresponding location of the display unit 110 as the private region 210. Also, the display device 100 may set a region of the display unit 110, which excludes the private region 210, as the public region 220. Also, the display device 100 may include a plurality of private regions 210 on the basis of a plurality of users. At this time, if a first private region and a second private region are set, the display device 100 may set the region that excludes the first private region and the second private region of the display unit 110 as the public region. Also, the display device 100 may display control objects 240-1, 240-2, 240-3, 240-4, 240-5, 240-6 and 240-7. At this time, the control objects may be objects controlled by a user who uses the display device 100. At this time, for example, the control object may be at least one of a user interface, an application, an icon, and a file. In more detail, the control object may be visual information controlled by the user of the display device 100 and displayed in the display unit 110 to implement an operation. At this time, for example, the control object may be located in the private region 210 or the public region 220. For example, if the control object is located in the private region 210, the control object may be controlled by a user who is allowed to access the private region 210. Also, for example, if the control object is located in the public region 220, the control object may be controlled by all the users who use the display device 100. In other words, the control object may be controlled differently depending on a control method on the basis of the location within the display unit 110.

Figure 2:
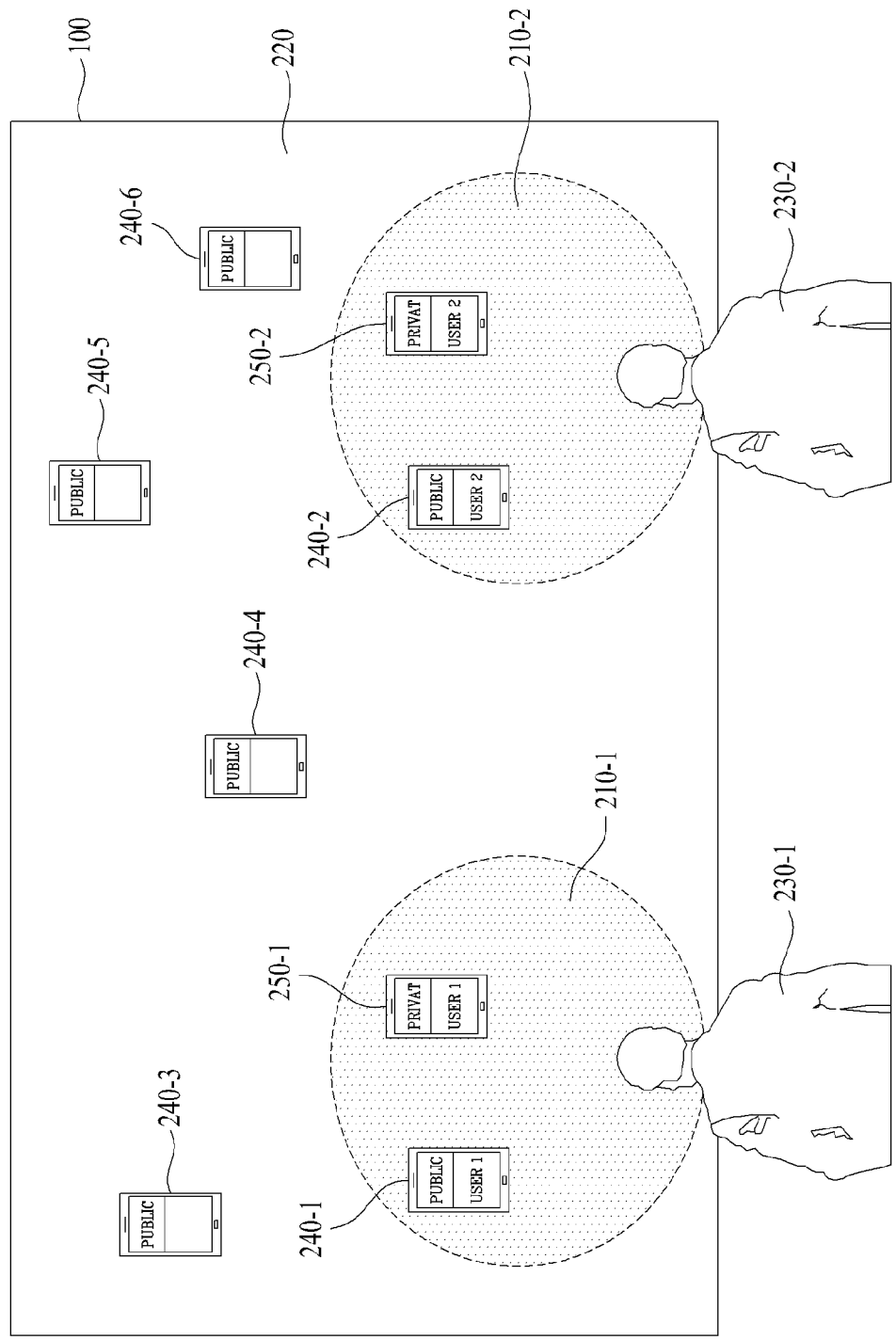
FIG. 2 is a diagram illustrating a display device used by a plurality of users in accordance with one embodiment of the present specification.

FIG. 2 is a diagram illustrating a display device used by a plurality of users in accordance with one embodiment of the present specification.

The display device 100 may display a control object. At this time, the control object may be displayed in a private region or a public region as described above. Also, the display device 100 may set a control method differently based on an object property of the control object. In more detail, the control object may have a private property as an object property. Alternatively, the control object may have a public property as an object property. At this time, for example, the display device 100 may set the object property based on an access authority of the user. In more detail, the display device 100 may set a property, which allows an access authority for a limited user, as a private property. In other words, the display device 100 may allow an allowed user only to use a control object having a private property based on a predetermined reference. Also, the display device 100 may set a property used by all the users, who use the display device 100, as a public property. In other words, the public property may mean an object property that may be used regardless of users. Also, for example, the display device 100 may set an object property based on a security level. In more detail, the display device 100 may set the public property as a property having the lowest security level. At this time, the display device 100 may set security of the control object having a public property to be lowered and to be used by everyone. Also, the display device 100 may set a control object having a first private property and a second private property based on a security level. At this time, the first private property may be an object property having a security level higher than that of the second private property. For example, the display device 100 may set the control object having the first private property having the highest security level to be used by a specific user only. At this time, for example, the control object may be an object related to personal privacy or a payment related object. In other words, the first private property may be an object property allowed for a specific user only even though the plurality of users use the display device 100. Also, for example, the display device 100 may allow the control object having the second private property to be used by a specific user group only. For example, the object having the second private property may be a club related object, a community related object, etc. In other words, the object having the second private property may be an object property, which allows an access authority for a user group only based on a predetermined method. On the other hand, the public property may be an object property that may be used by all the users who use the display device 100, as described above.

At this time, referring to FIG. 2, the display device 100 may display control objects 240-1, 240-2, 240-3, 240-4, 240-5, and 240-6 having a public property. At this time, a first user 230-1 may use the first private region 210-1. Also, a second user 230-2 may use a second private region 210-2. At this time, for example, if the first control object 240-1 having the public property is displayed in the first private region 210-1, the first user 230-1 may control the first control object 240-1. For example, the display device 100 may display use information of the first user 230-1 in the first control object 240-1. Also, if the second control object 240-2 having the public property is displayed in the second private region 210-2, the second user 230-2 may control the second control object 240-2. At this time, for example, the display device 100 may display use information of the second user 230-2 in the second control object 240-2. Also, the display device 100 may display control objects 250-1 and 250-2 having a private property. At this time, the third control object 250-1 having the private property may be the control object that may be used by the first user 230-1 only. Also, for example, the fourth control object 250-2 having the private property may be the control object that may be used by the second user 230-2 only. In other words, the control objects 250-1 and 250-2 having the private property may be the control objects which allow different access authorities set differently depending on users.

Figure 3A:
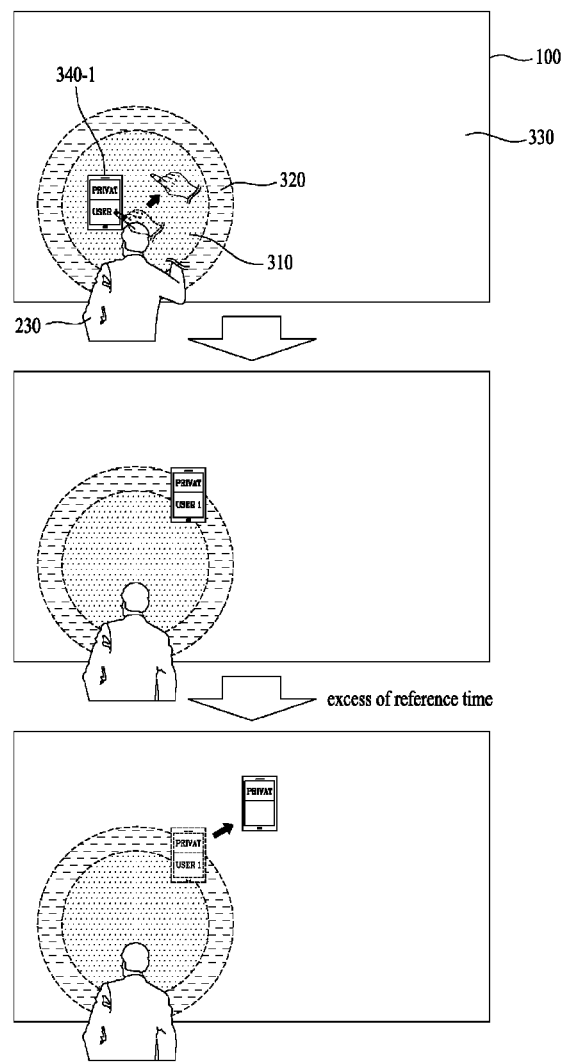
FIGS. 3a and 3b are diagrams illustrating a method for allowing a display device to move a control object from a private region to a public region based on an object property of the control object in accordance with one embodiment of the present specification.
Figure 3B:
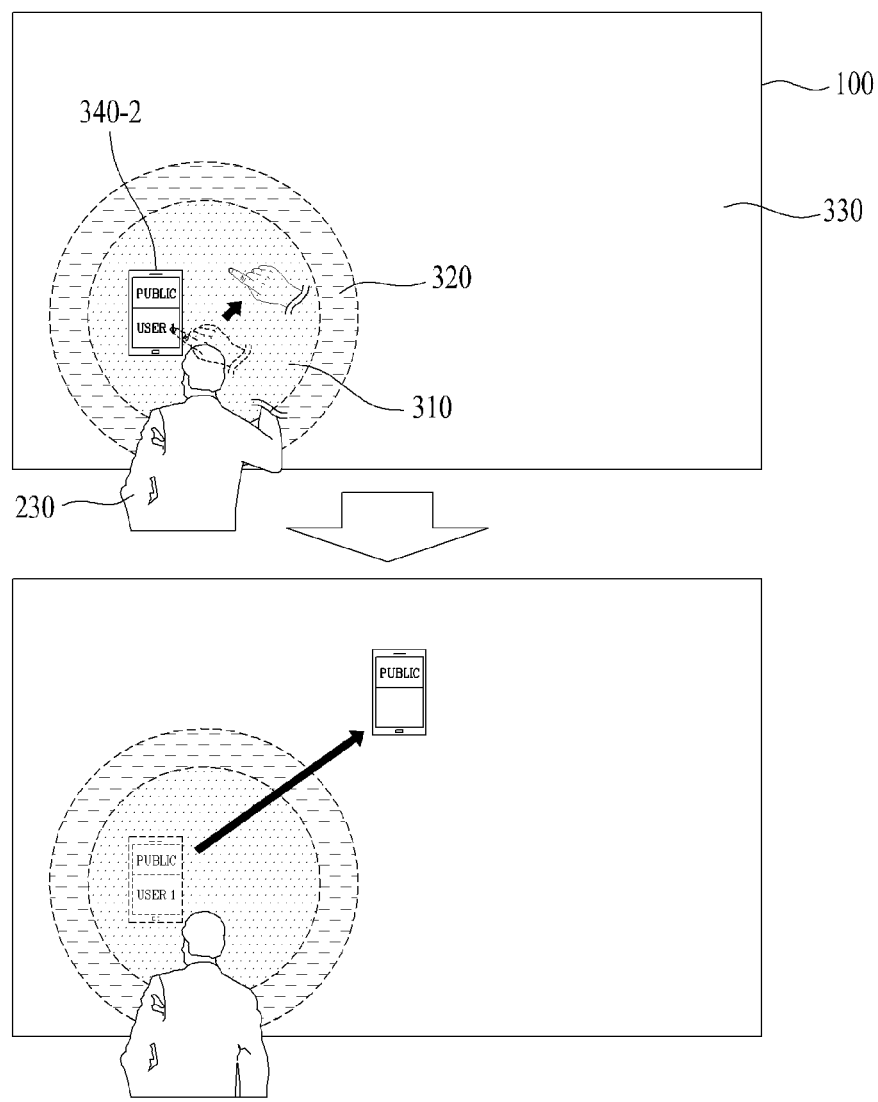

FIGS. 3a and 3b are diagrams illustrating a method for allowing a display device to move a control object from a private region 310 to a public region 330 based on an object property of the control object in accordance with one embodiment of the present specification. The display device 100 may display the control object in the private region 310. The user who uses the private region 310 may control and use the control objects located within the private region 310. At this time, the user who uses the private region 310 may move the control object from the private region 310 to the public region 330 so as not to use the control object any more or share the control object with another user. If the control object is moved from the private region 310 to the public region 320, the display device 100 may set a moving mode differently based on the object property of the control object. If the object property of the control object is the private property, the display device 100 may move the control object based on a first moving mode. Also, if the object property of the control object is the public property, the display device 100 may move the control object based on a second moving mode. At this time, the first moving mode may have a moving property different from those of the second moving mode. In this case, the moving property may be a moving speed, information on stop or not, a moving method, etc. The display device may set the moving method of the control object differently based on the object property of the control object. As a result, the user may identify the object property of the control object that is moving from the private region 310 to the public region 330.

In more detail, referring to FIG. 3a, the display device 100 may further include a buffer region 320. At this time, for example, the buffer region 320 may be a region included in a display unit 110 as described above. Also, for example, the buffer region 320 may be the region located between the private region 310 and the public region 330. In other words, if the control object is moved from the private region 310 to the public region 330, the control object may be moved to the public region 330 by necessarily passing through the buffer region.

At this time, the display device 100 may move the control object 340-1 having the private property based on the first moving mode. At this time, the display device 100 may detect a first control input. In this case, the first control input may be a touch input, a gesture input, etc. In more detail, the first control input may be the input that moves the control object 340-1 from the private region 310 to the public region 330, and is not limited to the above example. If the display device 100 detects the first control input, the control object 340-1 may be moved from the private region 310 to the buffer region 320. At this time, in case of the first moving mode as described above, the display device 100 may stop the control object 340-1 in the buffer region 320. In other words, the control object 340-1 having the private property may be stopped in the buffer region 320. At this time, the buffer region 320 may be a buffer line, which will be described later with reference to FIG. 7.

The display device 100 may stop the control object 340-1 in the buffer region 320 for a predetermined reference time. At this time, the predetermined reference time may be the time set by the user or a processor 150, and may be a threshold time. Also, the reference time may have a certain error range. In other words, the reference time is a stop time of the control object 340-1, and is not limited to the above example. The display device 100 may move the control object 340-1 from the buffer region 320 to the public region 330 if a predetermined time passes. In other words, if the control object 340-1 having the private property is moved from the private region 310 to the public region 330, the control object 340-1 may be moved to the public region 330 after staying in the buffer region 320 for a certain time.

At this time, for example, if the control object 340-1 having the private property is moved from the private region 310 to the public region 330, the display device 100 may change the object property of the control object 340-1 from the private property to the public property. Also, for example, the display device 100 may display information on the changed object property, and may change the property of the control object 340-1 without limitation to the aforementioned embodiment if the display device 100 detects a control input as to whether change is allowed, from the user.

Also, for example, referring to FIG. 3b, the display device 100 may move the control object 340-2 having the public property based on the second moving mode. At this time, the display device 100 may detect a first control input. In this case, the first control input may be a touch input, a gesture input, etc. In more detail, the first control input may be the input that moves the control object 340-2 from the private region 310 to the public region 330, and is not limited to the above example. If the display device 100 detects the first control input, the control object 340-2 may be moved from the private region 310 to the public region 330 through the buffer region 320. In more detail, if the display device 100 moves the control object 340-2 based on the second moving mode, the display device 100 may move the control object 340-2 to the public region 330 without stopping the control object 340-2 in the buffer region 320. In other words, the control object 340-2 having the public property may be moved from the private region 310 to the public region 330 without stop during motion. As a result, the display device 100 may set the moving method differently in accordance with the object property of the control object.

Figure 4A:
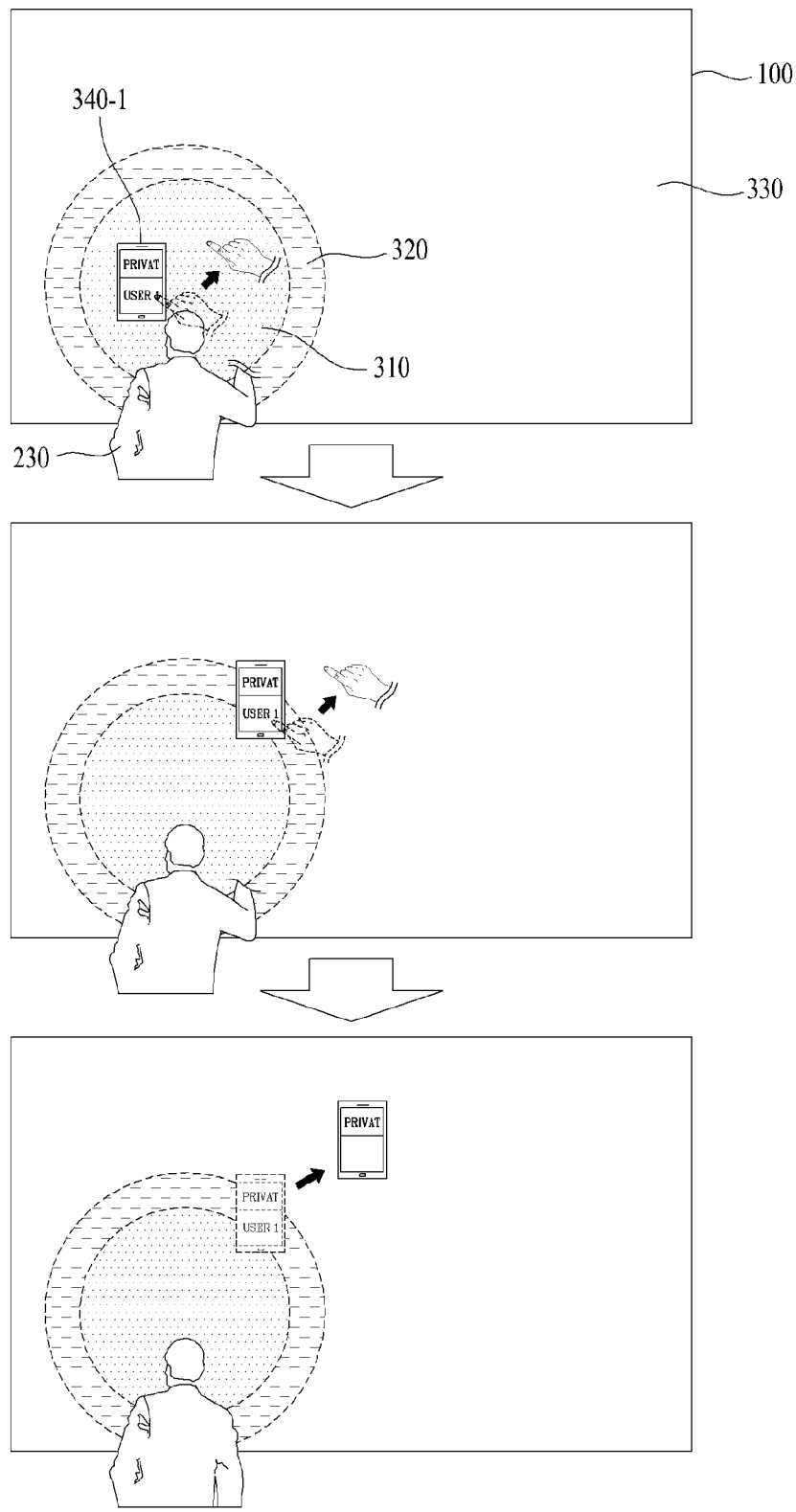
FIGS. 4a and 4b are diagrams illustrating a method for allowing a display device to move a control object based on a control input if the control object is stopped in a buffer region in accordance with one embodiment of the present specification.
Figure 4B:
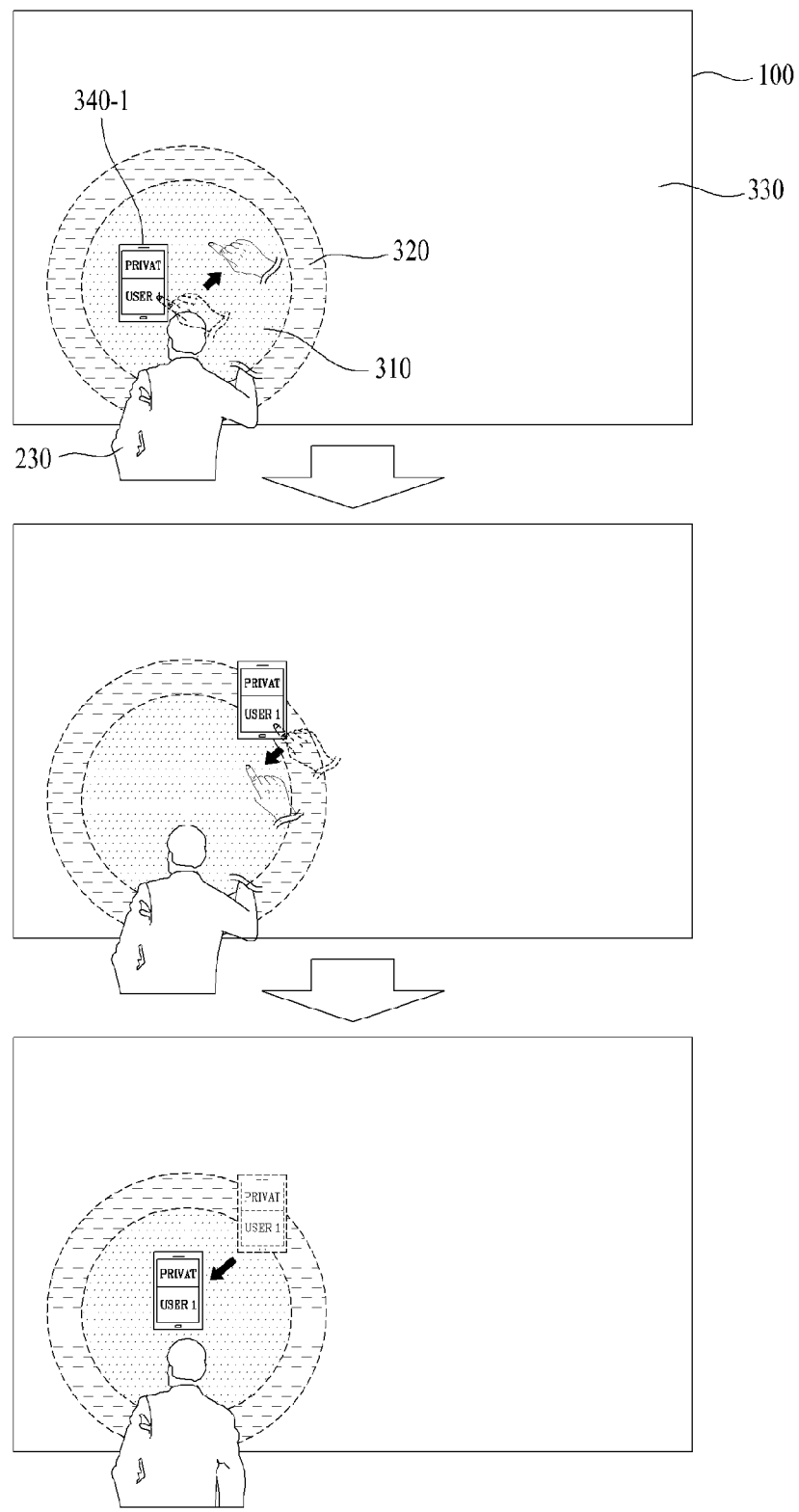

FIGS. 4a and 4b are diagrams illustrating a method for allowing a display device to move a control object based on a control input if the control object is stopped in a buffer region in accordance with one embodiment of the present specification. If the control object 340-1 having the private property is moved from the private region 310 to the public region 330, the display device 100 may stop the control object 340-1 in the buffer region 320 by detecting the first control input. At this time, for example, the display device 100 may move the control object 340-1 stopped in the buffer region 320 by detecting the control input that controls the control object 340-1. In more detail, if the control object 340-1 is stopped in the buffer region 320, the control object 340-1 may not be moved until the control input of the user is detected.

In more detail, referring to FIG. 4a, the display device 100 may detect the first control input. At this time, the control object 340-1 may be moved from the private region 310 to the buffer region 320. Also, the display device 100 may detect the second control input. In this case, the second control input may be a touch input, gesture input, etc. In other words, the second control input may be the input that moves the control object 340-1, and is not limited to the above example. Also, the second control input may be the input that moves the control object 340-1 from the buffer region 320 to the public region 330. In more detail, if the display device 100 detects the second control input, the display device 100 may move the control object 340-1 from the buffer region 320 to the public region 330. In other words, the display device may move the control object 340-1 from the private region 310 to the public region by using the first control input and the second control input.

For another example, referring to FIG. 4b, the display device 100 may detect a third control input in a state that the control object 340-1 is stopped in the buffer region 320. At this time, the third control input may be a touch input, gesture input, etc. In other words, the third control input may be the input that moves the control object 340-1, and is not limited to the above example. Also, the third control input may be the input that moves the control object 340-1 from the buffer region 320 to the private region 310. In more detail, if the display device 100 detects the third control input, the display device 100 may move the control object 340-1 from the buffer region 320 to the private region 310. In other words, the display device may again move the control object 340-1 to the private region 310 even after moving the control object 340-1 from the private region 310 to the buffer region 320. As a result, the user may use the control object 340-1 by moving again the same to the private region 310.

Figure 5A:
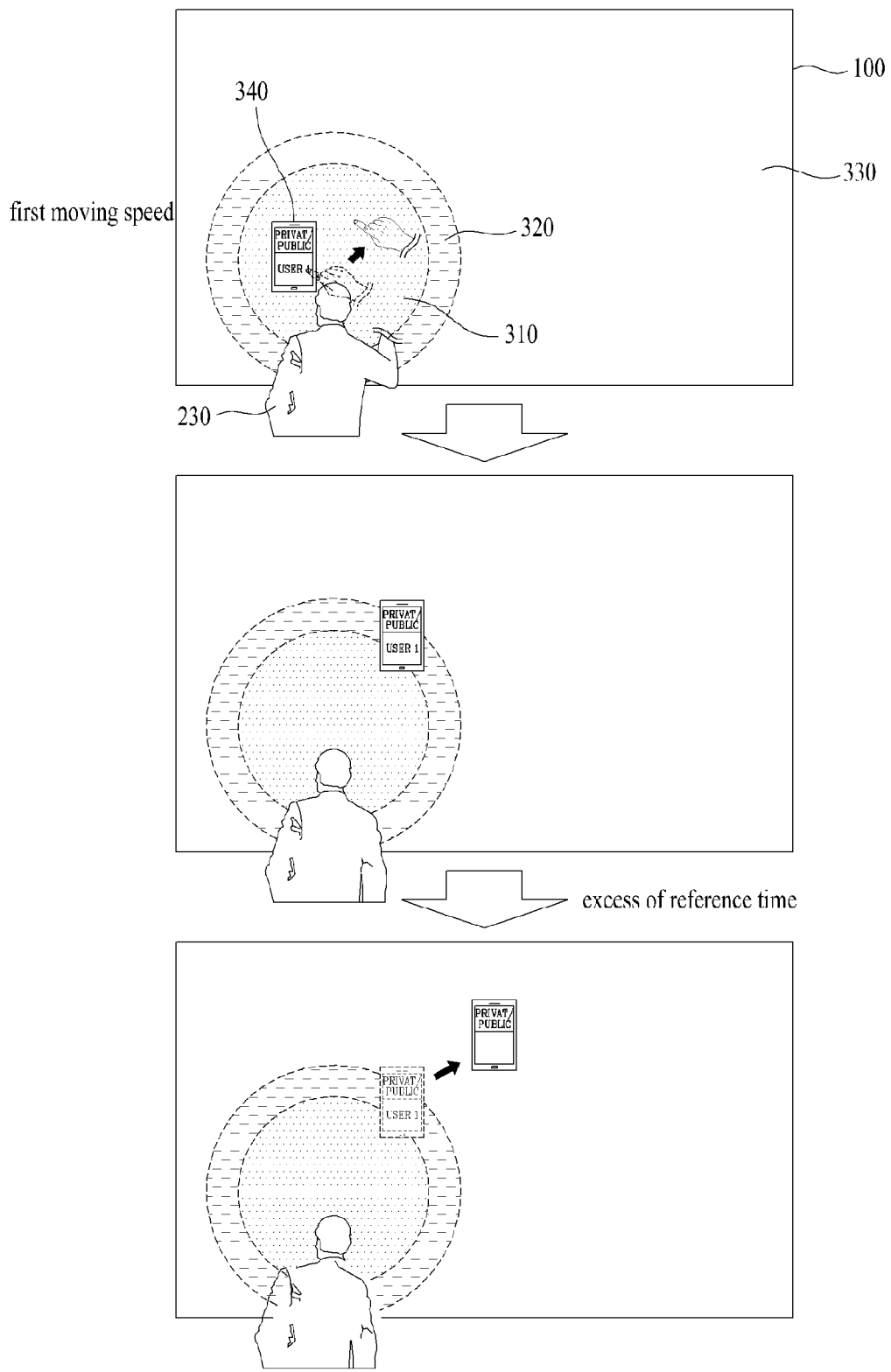
FIGS. 5a and 5b are diagrams illustrating a method for allowing a display device to move a control object from a private region to a public region based on a moving speed of the control object in accordance with one embodiment of the present specification.
Figure 5B:
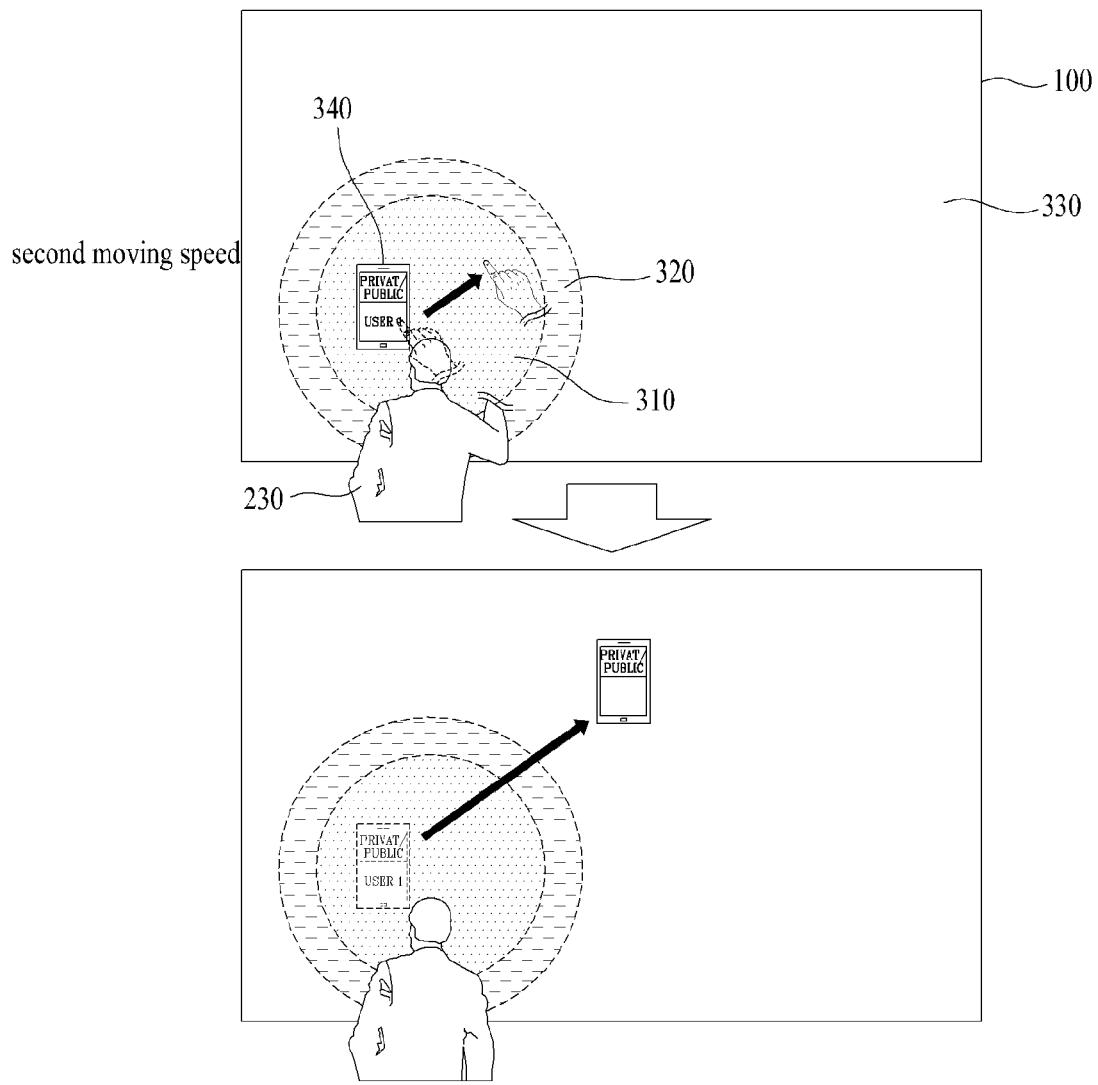

FIGS. 5a and 5b are diagrams illustrating a method for allowing a display device to move a control object from a private region to a public region based on a moving speed of the control object in accordance with one embodiment of the present specification. The display device 100 may set the moving method differently based on the moving speed of the control object. At this time, for example, the display device 100 may set the moving method regardless of an object property of the control object. In other words, the display device 100 may set the moving mode based on the moving speed of the control object.

In more detail, referring to FIG. 5a, the display device 100 may detect the first control input. At this time, as described above, the first control input may be the input that moves the control object 340 from the private region 310 to the public region 330. At this time, for example, the first control input may have a moving direction and a moving speed. For example, the first control input may be a slide input. At this time, if the user increases a sliding speed, the moving speed of the first control input may be increased. Also, the moving direction of the first control input may be determined based on a sliding direction of the user. At this time, the display device 100 may move the control object 340 based on the moving speed and moving direction of the first control input. In more detail, if the moving speed of the first control input is increased, the display device 100 may increase the moving speed of the control object 340. At this time, for example, the control object 340 may have a first moving speed. At this time, if the first moving speed is slower than a threshold speed, the device 100 may move the control object 340 from the private region 310 to the buffer region 320. At this time, the display device 100 may stop the control object 340 in the buffer region 320. Afterwards, the display device 100 may move the control object 340 from the buffer region 320 to the public region 330 if a predetermined reference time passes. Also, for example, the display device 100 may move the control object 340 based on the control input that moves the control object 340 stopped in the buffer region 320 as described above. At this time, the threshold speed may be the speed that determines whether the control object 340 is stopped in the buffer region 320. Also, the threshold speed may be changed by the user or the processor 150, and may have a certain error. In other words, the display device 100 may set the moving method of the control object 340 differently based on the threshold speed.

For example, referring to FIG. 5b, the display device 100 may move the control object 340 at a second moving speed. At this time, the second moving speed may be faster than the threshold speed. At this time, the display device 100 may move the control object 340 from the private region 310 to the public region 330 through the buffer region 320. In other words, if the speed of the control object 340 is faster than the threshold speed, the display device 100 may move the control object 340 to the public region 330 without stopping the control object 340 in the buffer region 320. As a result, the user may set the moving method of the control object 340 differently based on the moving speed.

For another example, the display device 100 may set the moving method of the control object 340 in accordance with types of gestures. In more detail, the display device 100 may detect a first gesture as the first control input. At this time, the display device 100 may stop the control object 340 in the buffer region 320. Afterwards, the display device 100 may move the control object 340 if the reference time is exceeded or another control input is detected. Also, the display device 100 may detect a second gesture as the first control input. At this time, the display device 100 may move the control object 340 from the private region 310 to the public region 330 without stopping the control object 340 in the buffer region 320. At this time, for example, the first gesture and the second gesture may be set by the user or the processor 150. Also, the first gesture and the second gesture may be the gestures that may be identified from each other by a control input sensing unit 120, and are not limited to the above example.

Figure 6:
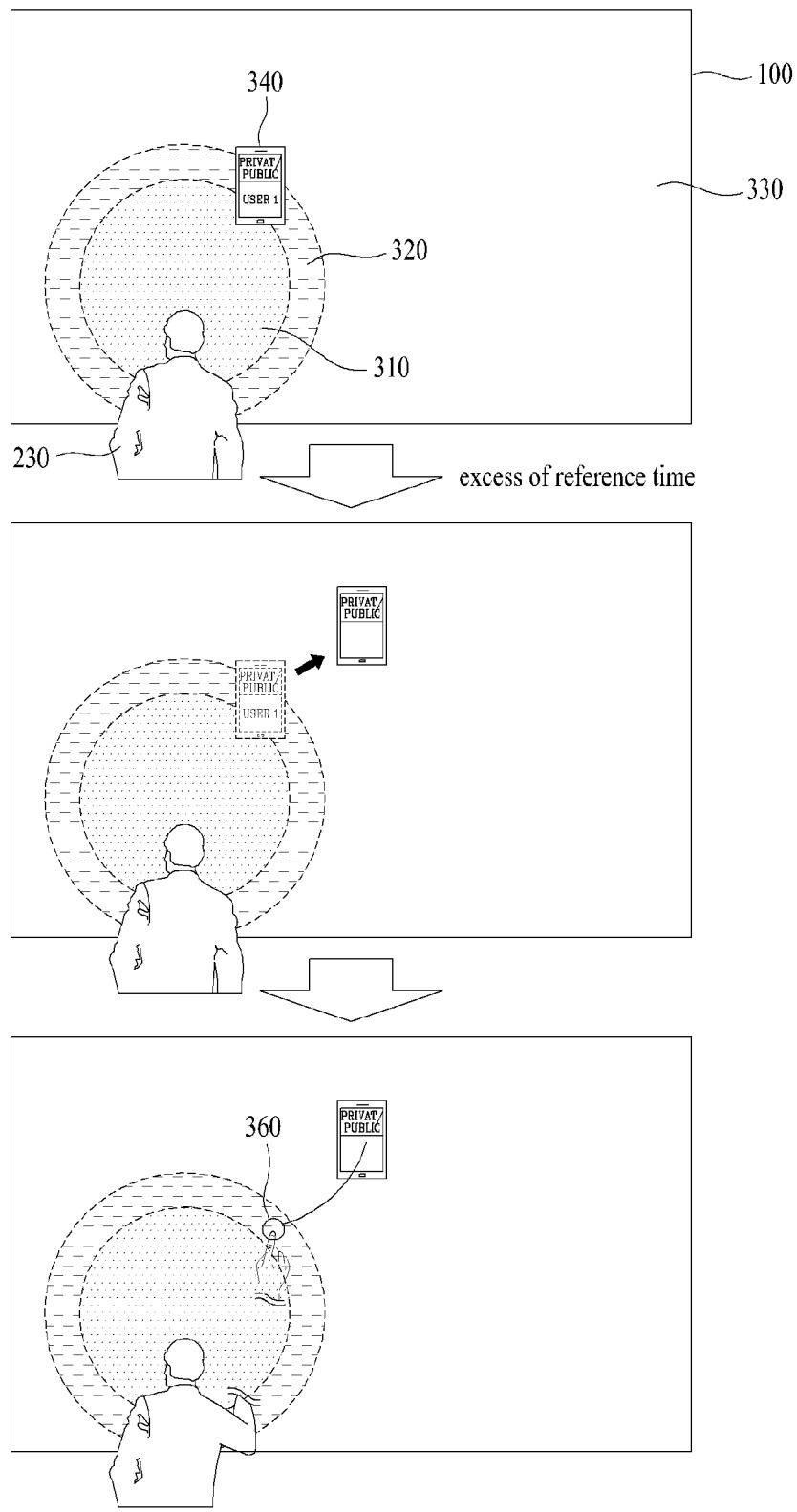
FIG. 6 is a diagram illustrating a method for allowing a display device to display a control indicator corresponding to a control object in accordance with one embodiment of the present specification.

FIG. 6 is a diagram illustrating a method for allowing a display device to display a control indicator corresponding to a control object in accordance with one embodiment of the present specification.

If the display device 100 moves the control object 340 to the public region 330, the display device 100 may display a control indicator 360 corresponding to the control object 340 in at least one of the private region 310 and the buffer region 320. At this time, for example, the control indicator 360 may be the indicator that indicates that the control object 340 is located in the public region 330. Also, the control indicator 360 may be the indicator for controlling the control object 340 moved to the public region 330. In more detail, if the display device 100 detects the control input of the user who selects the control indicator 360, the display device 100 may display menu information related to the control object 340 located in the public region 330. Also, for example, if the control indicator 360 is displayed in the buffer region 320, the display device 100 may control the control object 340 based on a first mode. Also, if the control indicator 360 is displayed in the private region 310, the display device 100 may control the control object 340 based on a second mode. In other words, the display device 100 may set the control method of the control object 340 differently based on the location where the control indicator 360 is displayed. At this time, for example, the first mode and the second mode are the modes of which control powers of the control object 340 are different from each other, and may have power levels different from each other. Also, if a plurality of users use the display device 100, the display device 100 may set the control method of the control indicator 360 differently as described later with reference to FIGS. 12 and 13.

Figure 7:
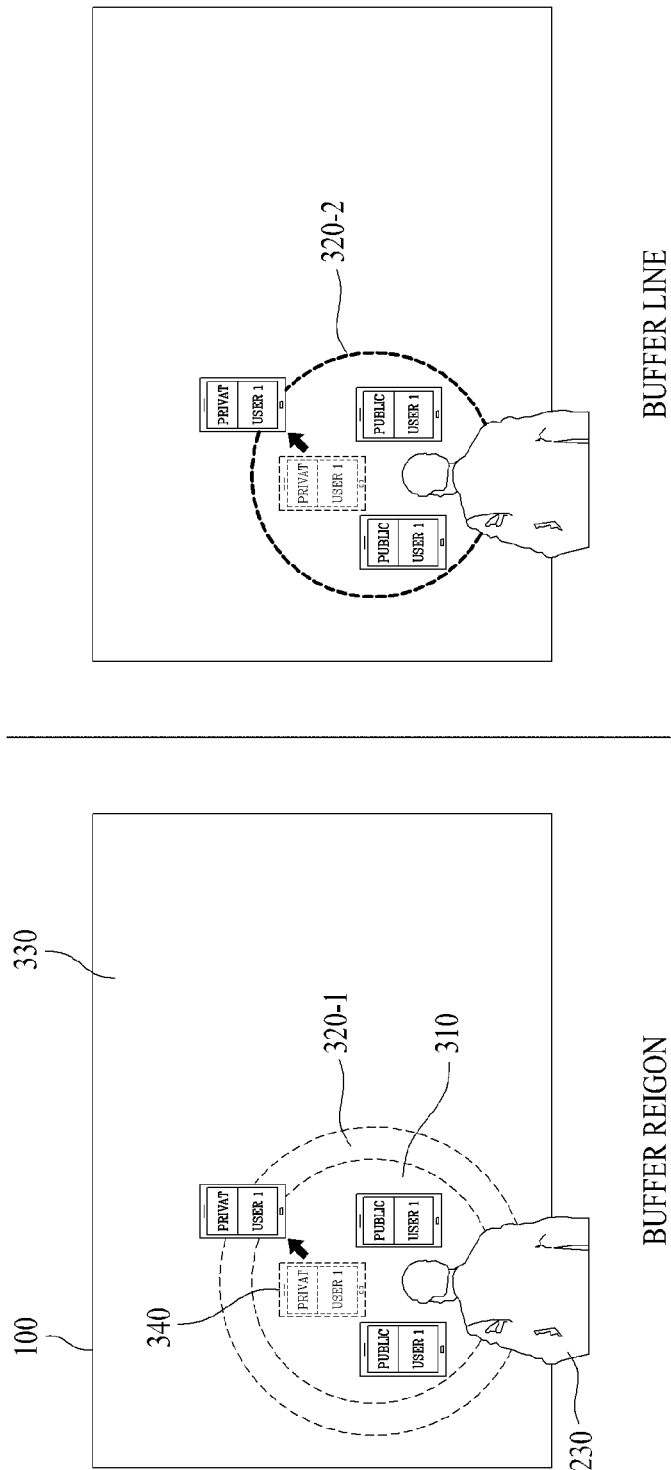
FIG. 7 is a diagram illustrating a method for allowing a display device to include a buffer region or a buffer line in accordance with one embodiment of the present specification.

FIG. 7 is a diagram illustrating a method for allowing a display device to include a buffer line in accordance with one embodiment of the present specification.

The display device 100 may include a buffer region as described above. At this time, the buffer region may be the region where the control object is stopped. For example, the buffer region may be the region located between the private region and the public region.

In more detain, referring to FIG. 7, the display device may set a buffer region 320-1 having a certain size at a boundary between the private region 310 and the public region 330. For example, if the private region 310 is set in the form of circle, the buffer region 320-1 may be set to surround the private region 310 in the form of circle having a certain size. At this time, the size of the buffer region 320-1 may be changed. For example, the size of the buffer region 320-1 may be very small. In other words, the buffer region 320-1 may be set at a boundary only between the private region 310 and the public region 330. In other words, the display device 100 may include a buffer line 320-2 instead of the buffer region 320-1. At this time, the buffer line 320-2 may be used equally to the aforementioned buffer region 320-1. In more detail, if the control object 340 is moved from the private region 310 to the public region 330, the control object 340 may be stopped in the buffer line 320-2. For example, the control object 340 may be overlapped with the buffer line 320-2. In other words, the control object 340 may be stopped in such a manner that some of the control object 340 is located in the private region 310 and the other of the control object 340 is located in the public region 330.

The display device 100 may include the buffer region 320-1 or the buffer line 320-2 as the region where the control object 340 is stopped, and is not limited to the above example. Also, for example, the buffer region 320-1 or the buffer line 320-2 may be set differently based on the shape of the private region 310. In other words, the buffer region 320-1 or the buffer line 320-2 may be located between the private region 310 and the public region 330, and its shape and size may be changed.

Figure 8A:
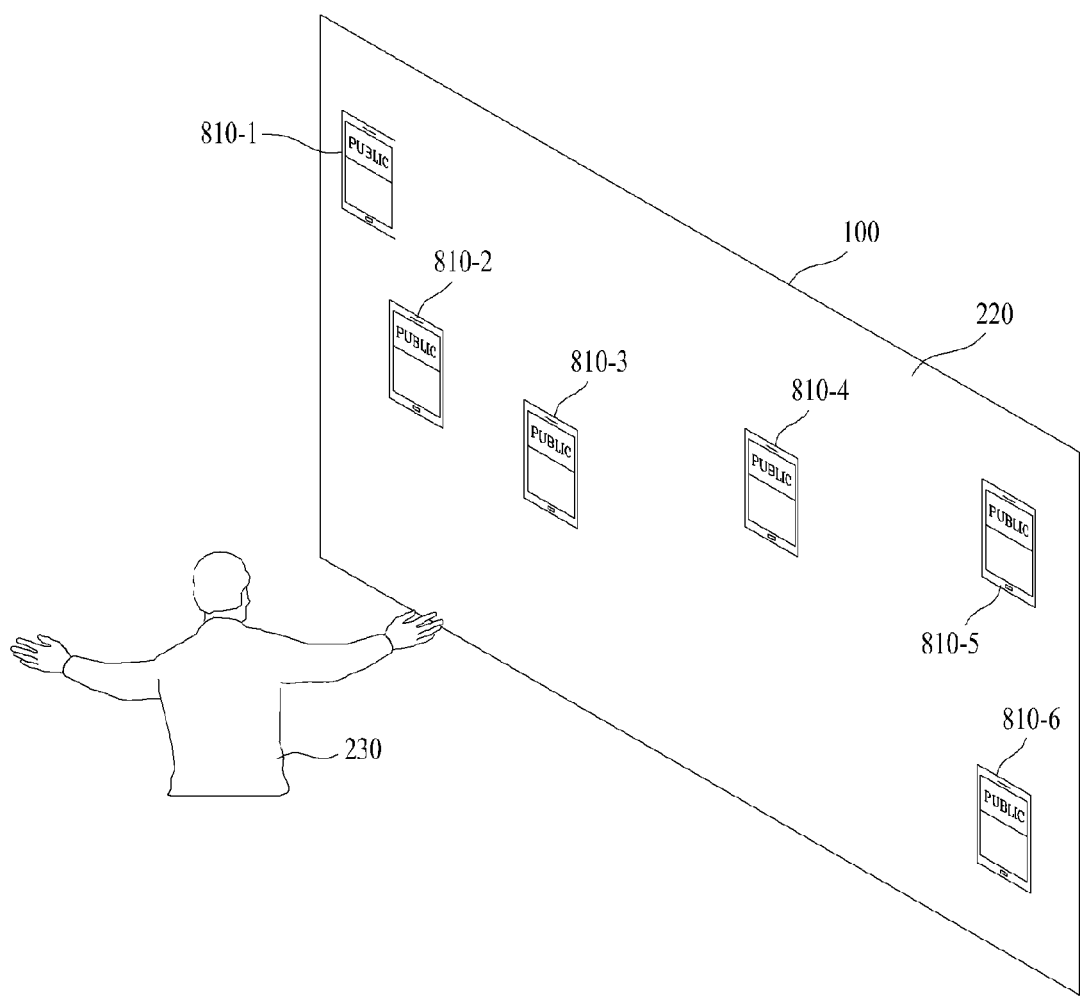
FIGS. 8a and 8b are diagrams illustrating a method for allowing a display device to display a control object based on a distance with a user in accordance with one embodiment of the present specification.
Figure 8B:
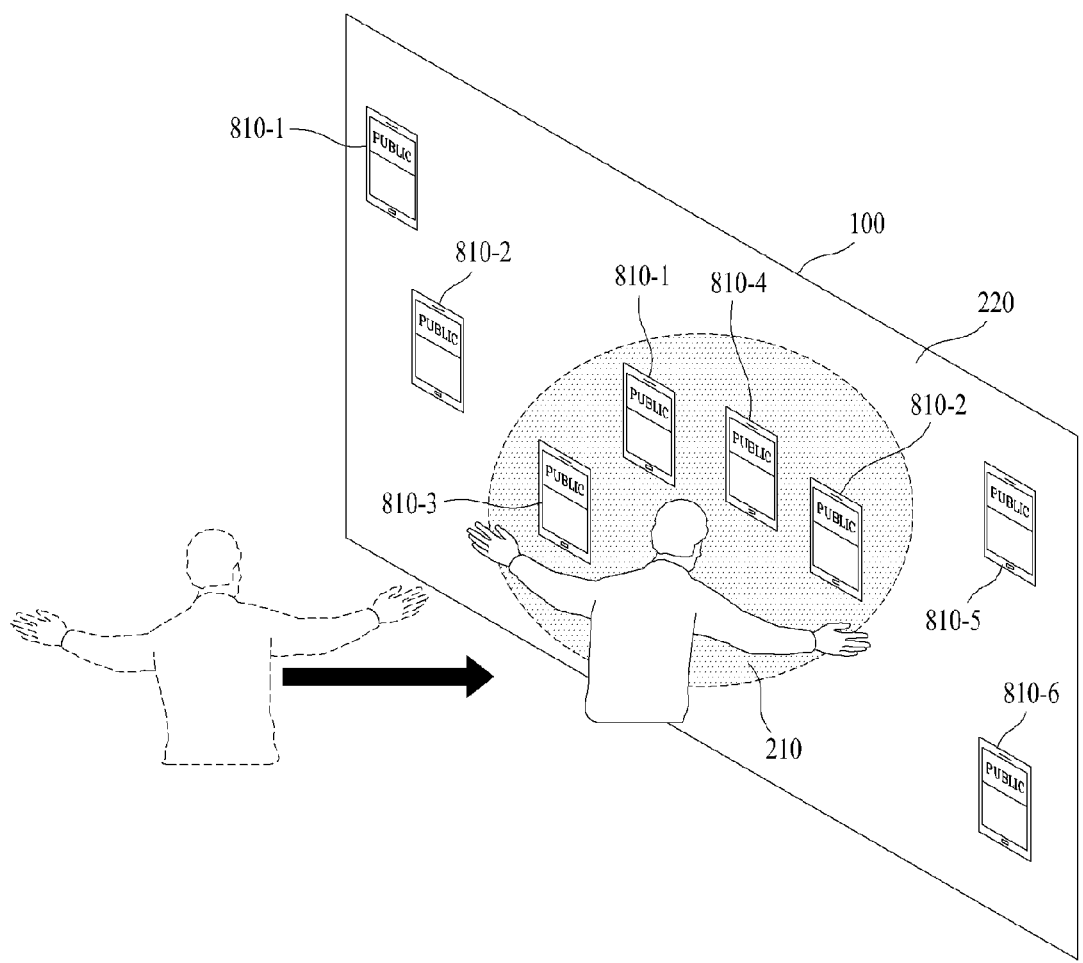

FIGS. 8a and 8b are diagrams illustrating a method for allowing a display device to display a control object based on a distance with a user in accordance with one embodiment of the present specification. The display device 100 may further detect the distance with the user by using at least one of a camera unit 130 and a sensor unit 140. At this time, the display device 100 may control a display method of control objects 810-1, 810-2, 810-3, 810-4, 810-5, 810-6, 820-1, and 820-2 based on the distance with the user.

In more detail, referring to FIG. 8a, if the distance between the display device 100 and the user is more than a first threshold distance, the display device 100 may display the control objects 810-1, 810-2, 810-3, 810-4, 810-5 and 810-6 only having a public property. In other words, if the user does not use the display device 100, the display device 100 may display the control objects 810-1, 810-2, 810-3, 810-4, 810-5 and 810-6 having a public property. Also, if the distance between the display device 100 and the user is more than the first threshold distance, the display device 100 may not set the private region. In other words, the private region may be the region set based on the user. Accordingly, if the display device 100 is not used by the user, the private region may not be set. At this time, the display device may set the entire display unit 110 as the public region 220. At this time, the first threshold distance may be the threshold distance that determines whether the user uses the display device 100. Also, the first threshold distance may be changes and set by the user or the processor 150, and is not limited to the above example.

Also, referring to FIG. 8b, if it is detected that the distance between the display device 100 and the user is within the first threshold distance, the display device 100 may set the private region 210 based on the user. At this time, for example, the display device 100 may detect the user by using at least one of the camera unit 130 and the sensor unit 140. Also, for example, the display device 100 may further detect a location of eyes of the user by using at least one of the camera unit 130 and the sensor unit 140. At this time, for example, the display device 100 may set a region located within a first distance from the detected location of eyes of the user as the private region 810. At this time, a point where the eyes of the user reach may be a predetermined point. Also, the first distance may be changed and set by the user or the processor 150. Also, for example, the display device 100 may further detect an arm length of the user by using the camera unit 130 and the sensor unit 140. At this time, the display device 100 may set the first distance based on the arm length of the user. In other words, the display device 100 may set the region that may be used by the user as the private region 810. Also, for example, the display device may set the region of the display unit 110, which is not the private region 210, as the public region 220. As a result, the display device 100 may set the private region 210 used personally based on the user. Also, the display device 100 may set the public region 220 used by all the users based on the private region 210.

Also, the display device 100 may further display the control object 820-1 and 820-2 having a private property. In other words, the display device 100 may set the private region 210 if the user uses the display device 100. At this time, the display device 100 may display the control objects 810-1, 810-2, 810-3, 810-4, 810-5 and 810-6 having a public property and the control objects 820-1 and 820-1 having a private property. In other words, the display device 100 may always display the control objects 810-1, 810-2, 810-3, 810-4, 810-5 and 810-6 having a public property, and may display the control objects 820-1 and 820-2 having a private property based on the distance with the user.

Figure 9:
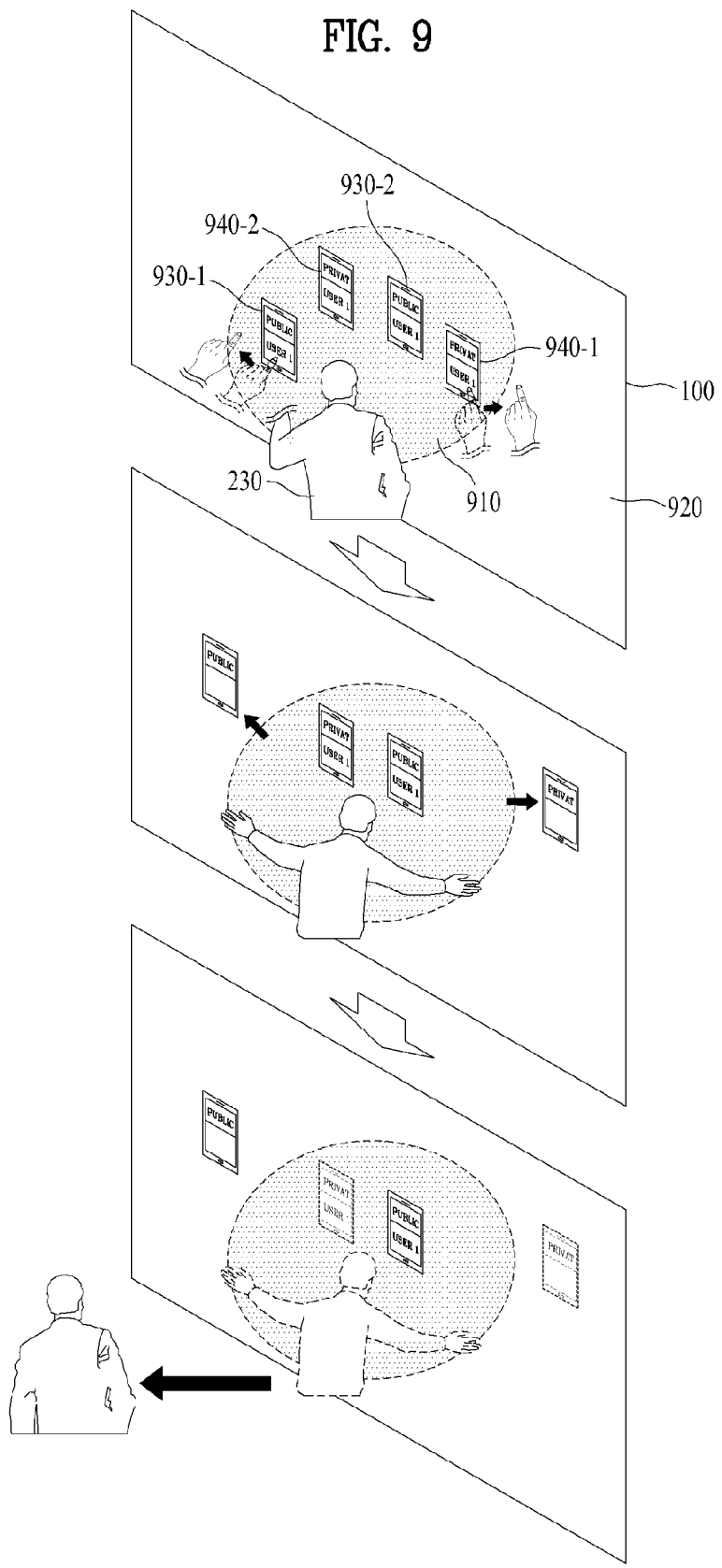
FIG. 9 is a diagram illustrating a method for allowing a display device to display a control object based on a distance with a user in accordance with one embodiment of the present specification.

FIG. 9 is a diagram illustrating a method for allowing a display device to display a control object based on a distance with a user in accordance with one embodiment of the present specification.

In display device may display control objects 930-1 and 930-2 having a public property in a private region 910 and control them. Also, the display device 100 may display control objects 940-1 and 940-2 having a private property in the private region 910 and control them. For example, the user who uses the private region 910 may use and control the control objects 930-1, 930-2, 940-1 and 940-2 located within the private region 910. At this time, for example, the control objects may display the private region 910 which is used and user information. At this time, if the control objects are moved from the private region 910 to a public region 920, the display device 100 may set a display method of the user information differently based on an object property of the control objects.

In more detail, the object property of the first control object 930-1 may be the public property. Also, the object property of the second control object 940-1 may be the private property. At this time, if the first control object 930-1 is moved from the private region 910 to the public region 920, the first control 930-1 may not display the user information. In other words, the first control object 930-1 is a public control object and may not be used by a specific user. On the other hand, if the second control object 940-1 is moved from the private region 910 to the public region 920, the second control object 940-1 may continue to display the user information. In more detail, the second control object 940-1 may be the control object having a private property. At this time, for example, the second control object 94-1 may be the control object which allows an access authority for the first user 230. Accordingly, even though the second control object 940-1 is moved to the public region 920, a second user (not shown) cannot control the second control object 940-1. At this time, if the second control object 940-1 is moved to the public region 920, the second control object 940-1 may continue to display the user information. In other words, the second control object 940-1 may continue to display the user information allowed for access regardless of the display region.

Also, for example, if the first user 340 does not use the display device 100, the display device 100 may not display the control objects 940-1 and 940-2, which allow an access authority for the first user 230, and the private region 910. At this time, for example, if the distance between the first user 230 and the display device 100 exceeds a threshold distance, the display device 100 may detect that the first user 230 does not use the display device 100. At this time, for example, the display device 100 may end display of the control objects 940-1 and 940-2 having a private property, which are located inside and outside the private region 910. For example, the control objects 930-1 and 930-2 having a public property may be displayed regardless of the fact whether the display device is used by the user or not.

Figure 10A:
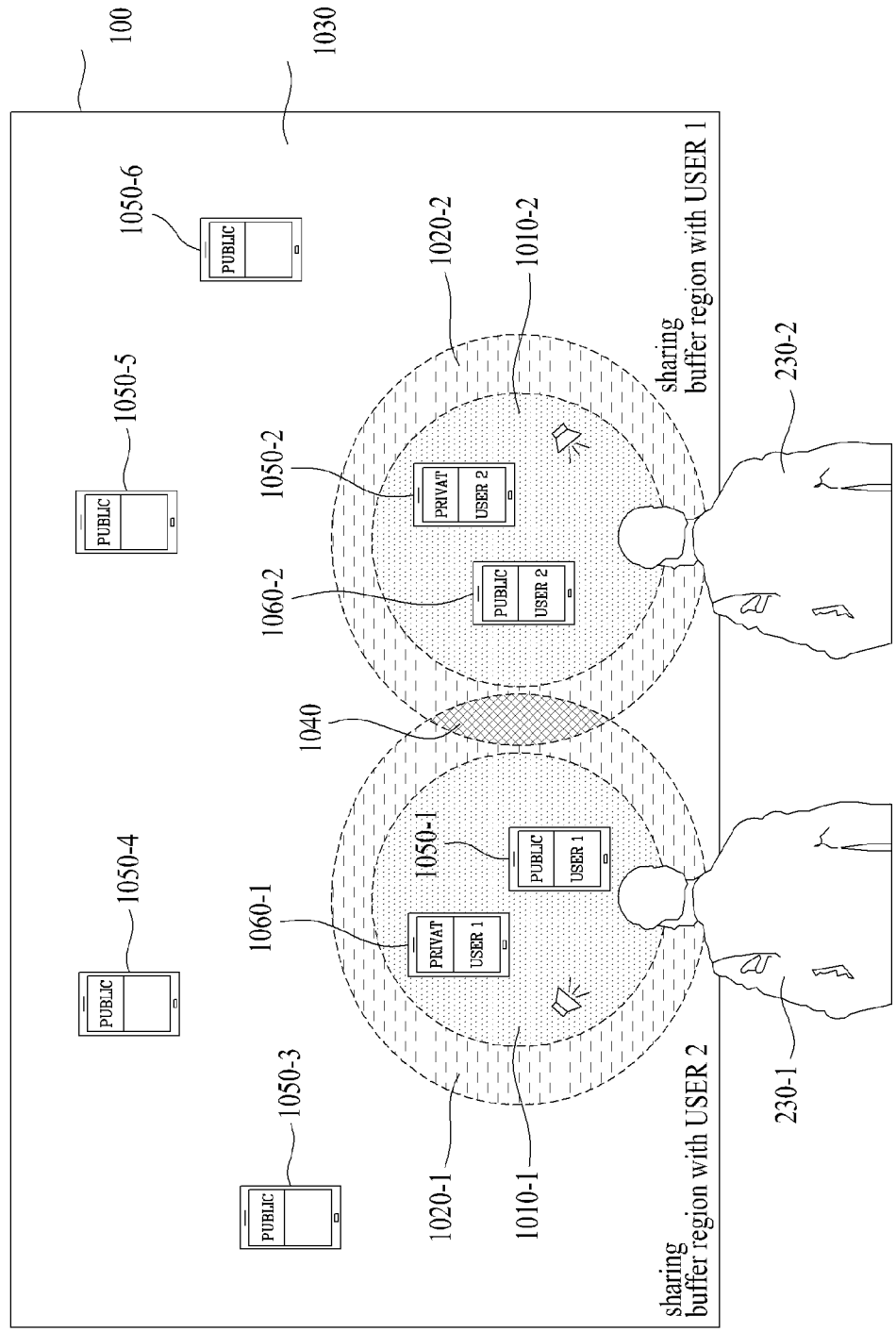
FIGS. 10a and 10b are diagrams illustrating a method for sharing a buffer region through a plurality of users in accordance with one embodiment of the present specification.
Figure 10B:
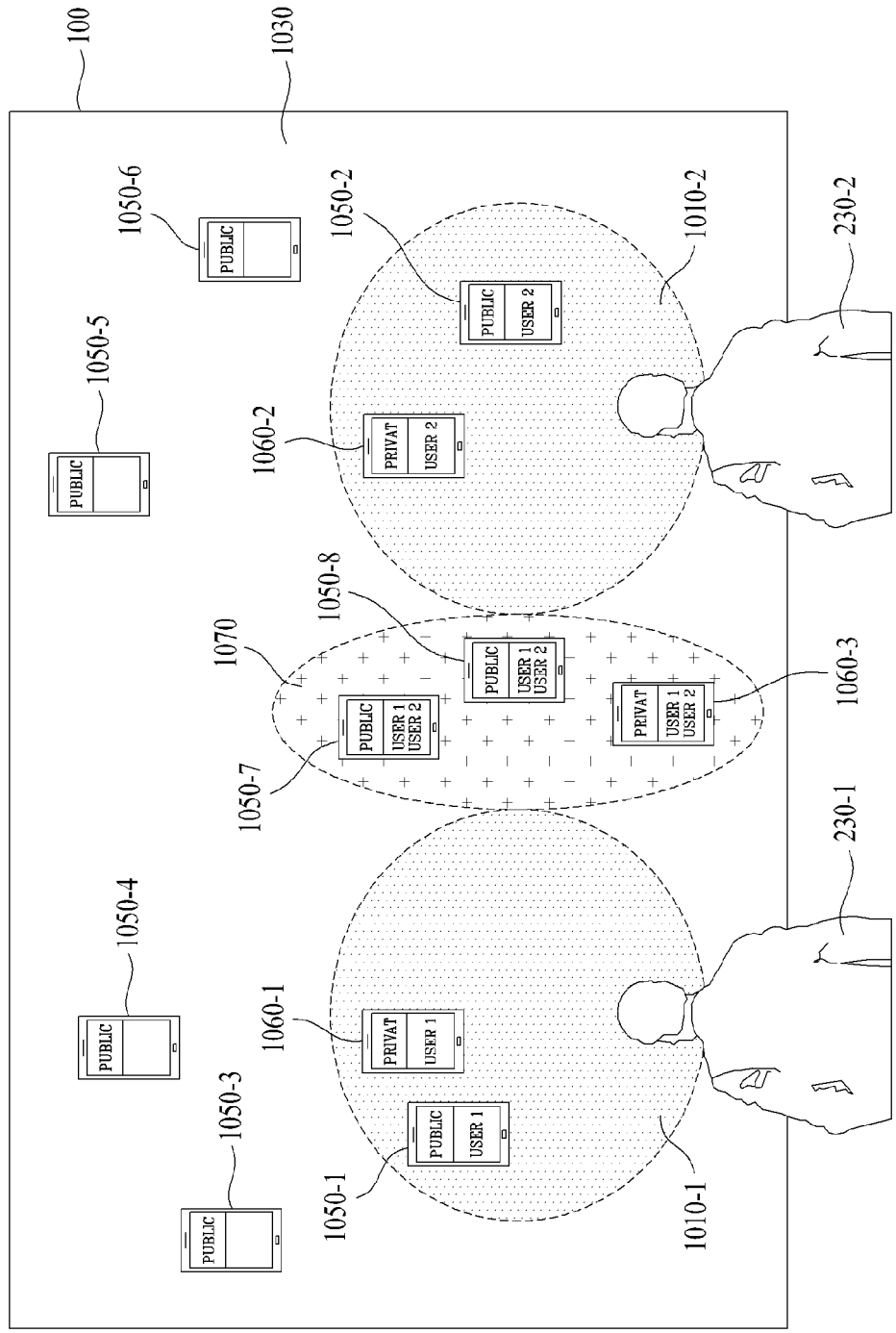

FIGS. 10a and 10b are diagrams illustrating a method for sharing a buffer region through a plurality of users in accordance with one embodiment of the present specification. The display device 100 may include a first private region 1010-1 and a first buffer region 1020-1. The first private region 1010-1 and the first buffer region 1020-1 may be the regions controlled by a first user 230-1. Also, the display device 100 may include a second private region 1010-2 and a second buffer region 1020-2. The second private region 1010-2 and the second buffer region 1020-2 may be the regions controlled by a second user 230-2. At this time, for example, the display device 100 may set the second private region 1010-2 so as not to overlap the first private region 1010-1. On the other hand, for example, the display device 100 may set the first buffer region 1020-1 to overlap the second buffer region 1020-2. In other words, the display device 100 may set the private regions 1010-1 and 1010-2 so as not to overlap each other, and may set the buffer regions 1020-1 and 1020-2 to overlap each other. For example, if the first buffer region 1020-1 and the second buffer region 1020-2 are overlapped with each other, the display device 100 may deliver a feedback signal to the first user 230-1 and the second user 230-2. In other words, the display device 100 may deliver information on an overlap region 1040 where the first buffer region 1020-1 and the second buffer region 1020-2 are overlapped with each other to the first user 230-1 and the second user 230-2. At this time, for example, the feedback signal may be at least one of an audio feedback signal, a tactile feedback signal and a visual feedback signal. In other words, the display device 100 may notify the users 230-1 and 230-2 that the buffer regions are overlapped with each other.

For another example, referring to FIG. 10b, the display device 100 may include a third buffer region 1070. At this time, for example, the third buffer region 1070 may be the region that may be used by both the first user 203-1 and the second user 230-2. In more detail, the display device 100 may display control objects 1050-1 and 1050-2 in the first private region 1010-1. At this time, the control objects 1050-1 and 1060-1 displayed in the first private region 1010-1 may be controlled by the first user 230-1. Also, the display device 100 may display the control objects 1050-2 and 1060-2 in the second private region 1010-2. The control objects 1050-2 and 1060-2 displayed in the second private region 1010-2 may be controlled by the second user 230-2. Also, the display device 100 may display control objects 1050-3, 1050-4, 1050-5 and 1050-6 in a public region 1020. At this time, the control objects 1050-3, 1050-4, 1050-5 and 1050-6 displayed in the public region 1030 may be controlled by all the users who use the display device 100.

Also, for example, the display device 100 may display control objects 1050-7, 1050-8 and 1060-3 in the third buffer region 1070. At this time, the control objects 1050-7, 1050-8 and 1060-3 displayed in the third buffer region 1070 may be controlled by the first user 230-1 and the second user 230-2 only. In other words, the display device 100 may include the third buffer region 1070 as a common region of the first user 230-1 and the second user 230-2. At this time, access authorities of the control objects 1050-7, 1050-8 and 1060-3 displayed in the third buffer region 1070 may be given to the first 230-1 and the second user 230-2 only. In other words, the display device 100 may include a region that varies a control method, and is not limited to the aforementioned example.

Figure 11:
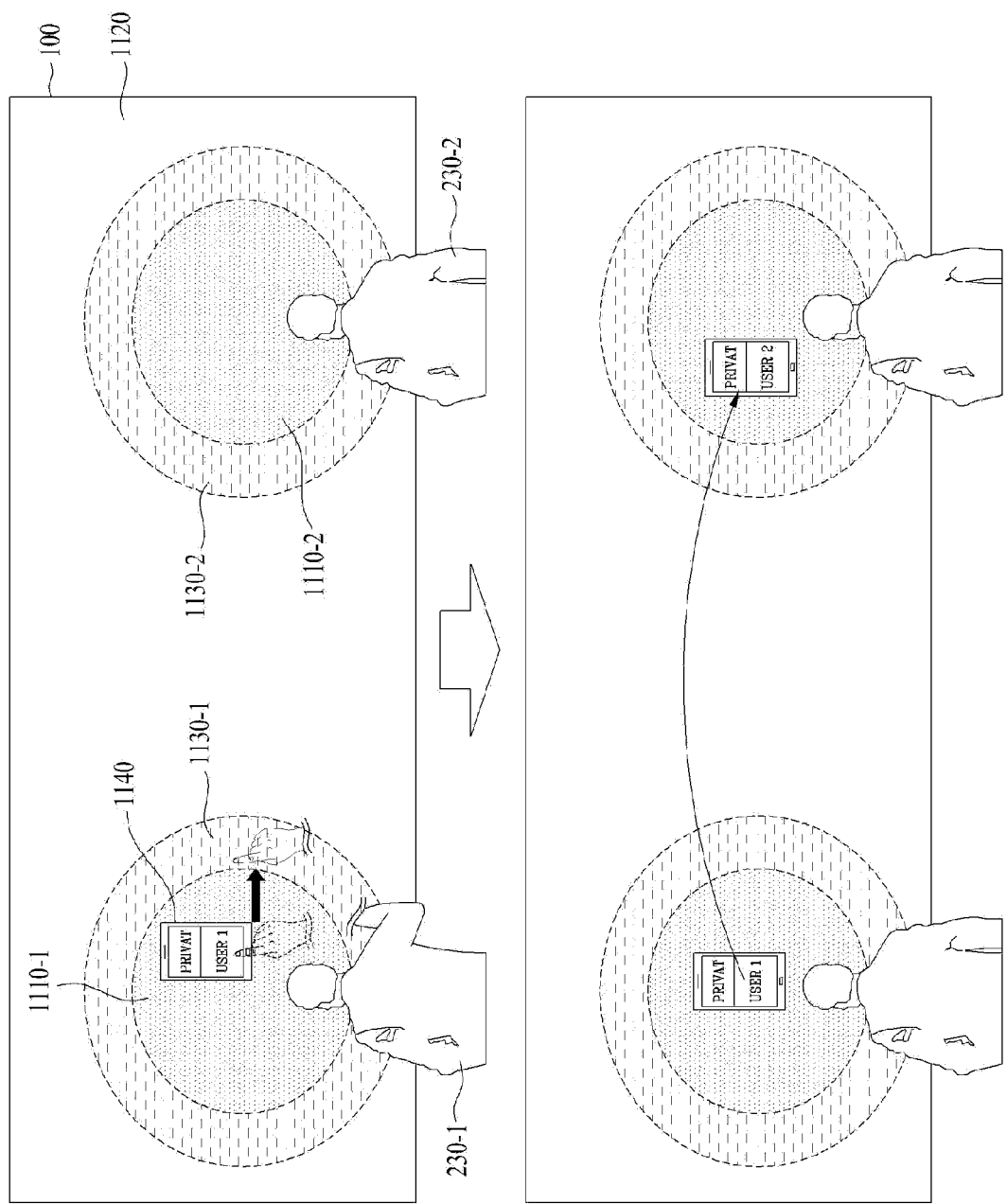
FIG. 11 is a diagram illustrating a method for allowing a plurality of users to exchange a control object with one another in accordance with one embodiment of the present specification.

FIG. 11 is a diagram illustrating a method for allowing a plurality of users to exchange a control object with one another in accordance with one embodiment of the present specification.

The display device 100 may move a control object 1140 from a first private region 1110-1 to a public region 1120. Afterwards, the display device 100 may move the control object 1140 from the public region 1120 to a second private region 1110-2. At this time, the display device 100 may set a moving mode differently based on an object property of the control object 1140. In more detail, the display device 100 may move the control object 1140, which is moved to the public region 1120, to the second private region 1110-2. At this time, for example, if the object property of the control object 1140 is a private property, the display device 100 may detect a first control input. The first control input may be a touch input or a gesture input as described above. The display device 100 may move the control object 1140 from the public region 1120 to a second buffer region 1130-2 based on the detected first control input. At this time, the display device 100 may stop the control object 1140 in the second buffer region 1130-2 for a predetermined reference time. Afterwards, the display device 100 may move the control object 1140 from the second buffer region 1130-2 to the second private region 1110-2. Also, for example, the display device 100 may detect a second control input in a state that the control object 1140 is stopped in the second buffer region 1130-2. At this time, the second control input may be the input that moves the control object 1140 from the second buffer region 1130-2 to the second private region 1110-2. The display device 100 may move the control object 1140 from the second buffer region 1130-2 to the second private region 1110-2 based on the detected second control input. Also, for example, the display device 100 may detect a third control input in a state that the control object 1140 is stopped in the second buffer region 1130-2. At this time, the third control input may be the input that moves the control object 1140 from the second buffer region 1130-2 to the public region 1130. This display device 100 may move the control object 1140 from the second buffer region 1130-2 to the public region 1120 based on the detected third control input. In other words, if the control object 1140 having a private property is moved from the first private region 1110-1 to the second private region 1110-2, the display device 100 may stop the control object 1140 in the second first buffer region 1130-1 and the second buffer region 1130-2 for a predetermined reference time.

For another example, the display device 100 may move the control object 1140 from the public region 1120 to the second private region 1110-2. At this time, if an object property of the control object is a public property, the display device 100 may move the control object to the second private region 1110-2 without stopping in the control object in the second buffer region 1130-2.

Figure 12:
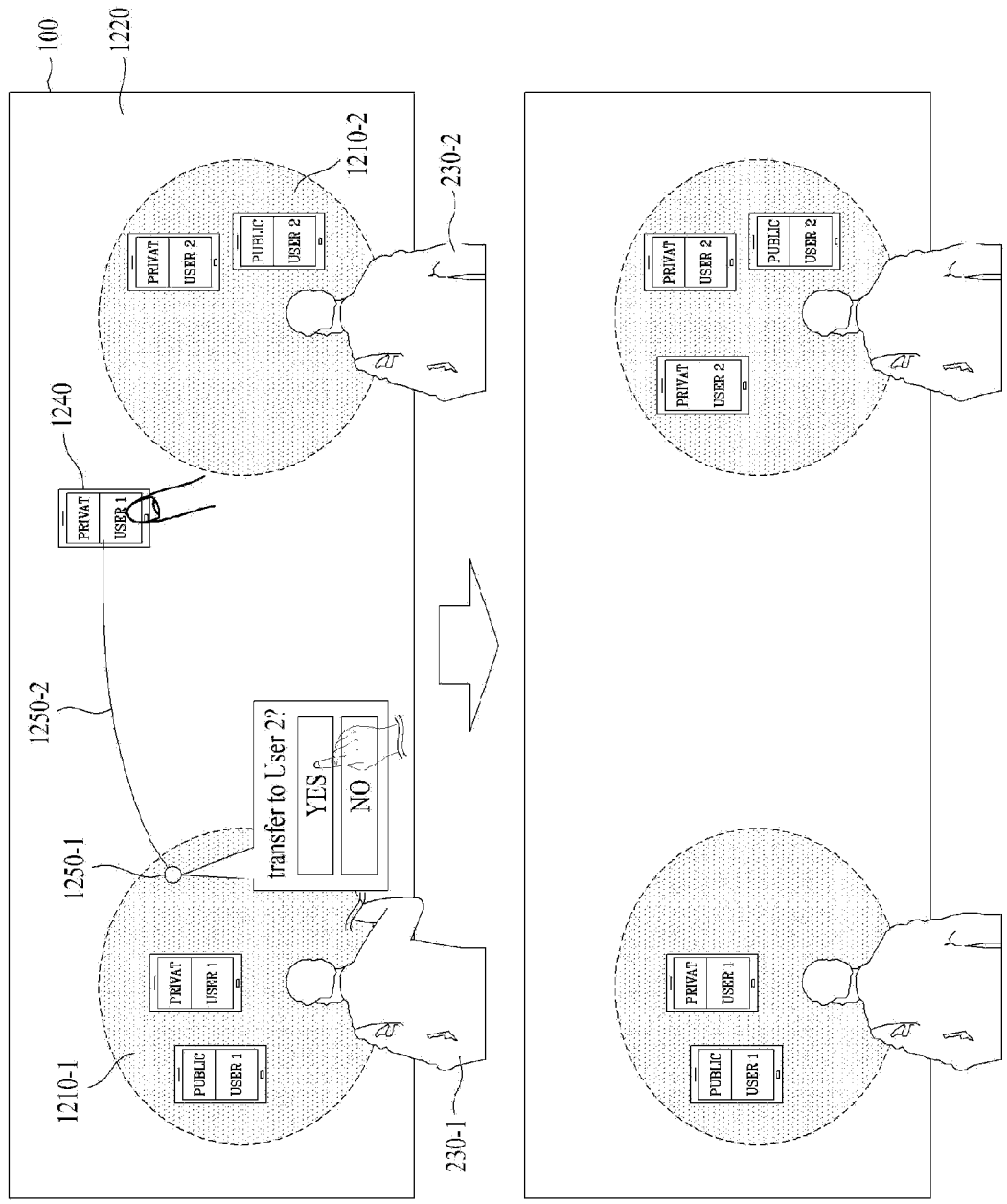
FIG. 12 is a diagram illustrating a method for displaying a control indicator for controlling a control object in accordance with one embodiment of the present specification.

FIG. 12 is a diagram illustrating a method for displaying a control indicator for controlling a control object in accordance with one embodiment of the present specification. The display device 100 may display a control indicator 1250-1 corresponding to a control object 1240 if the control object 1240 is moved from a first private region 1210-1 to a public region 1220. At this time, the control indicator 1250-1 may be the indicator that indicates that the control object 1240 is located in the public region 1220. Also, the display device 100 may further display a line indicator 1250-2 that connects the control indicator 1250-1 with the control object 1240. At this time, the line indicator 1250-2 may be the indicator indicating whether the control indicator 1250-1 is connected with the control object 1240.

At this time, for example, the display device 100 may move the control object 1240, which is moved to the public region 1220, to a second private region 1210-1. At this time, for example, if the control object 1240 is moved from the public region 1220 to the second private region 1210-2, the display device 100 may detect a first control input that selects the control object 1240. At this time, for example, the first control input may be the control input for allowing a second user 230-2 to move the control object 1240. If the display device 100 detects the first control input, the display device 100 may display information as to whether the control object 1240 is moved, in the first private region 1210-1 based on the control indicator 1250-1. At this time, for example, the display device may detect a second control input. The second control input may be the input detected by a first user 230-1. Also, the second control input may be the input that allows the first user 230-1 to move the control object 1240. The display device 100 may move the control object 1240 to the second private region 1210-2 based on the second control input. In other words, the display device 100 may indicate whether the control object 1240 is moved and control information by using the control indicator 1250-1.

Figure 13:
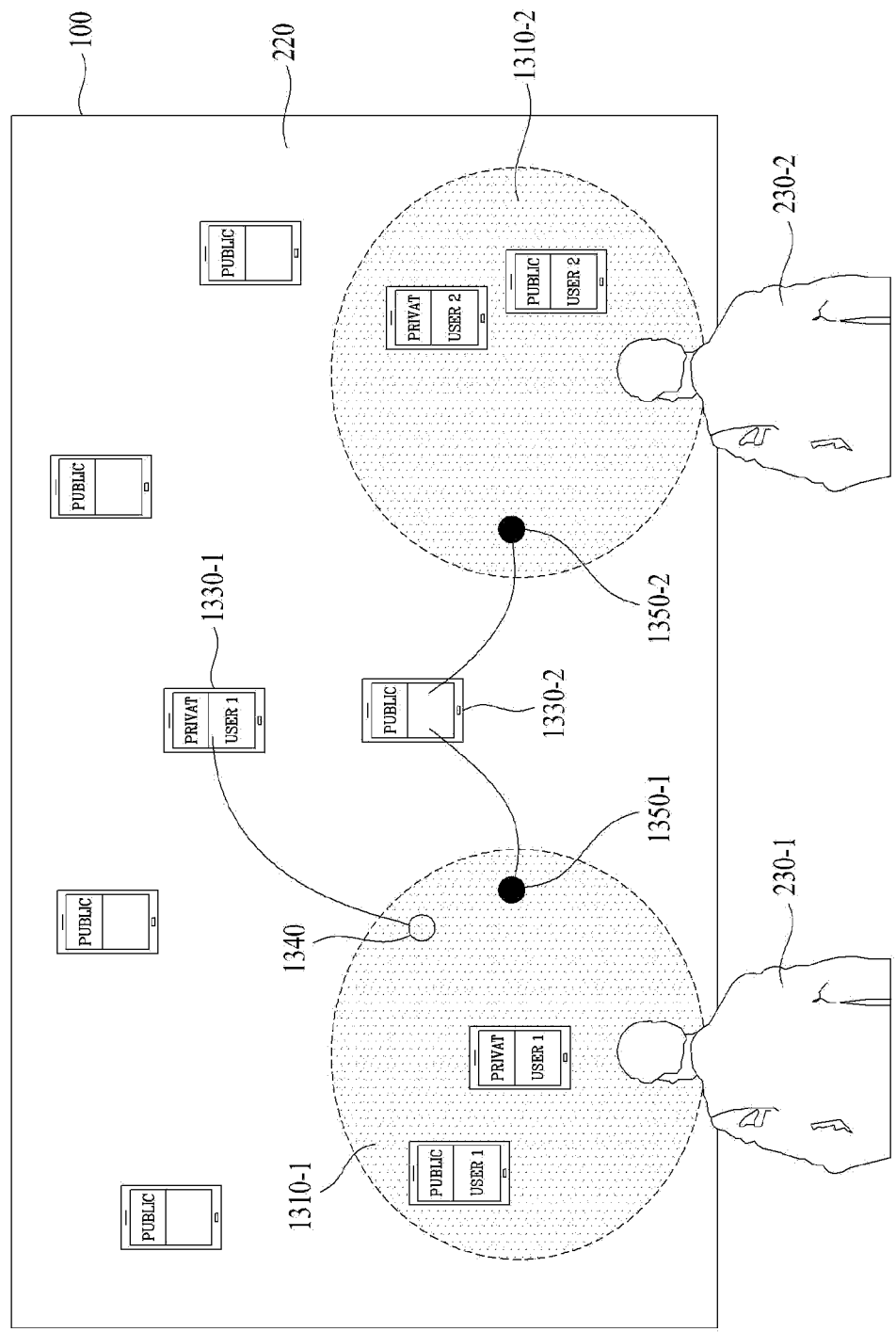
FIG. 13 is a diagram illustrating a method for displaying a control indicator based on an object property of a control object in accordance with one embodiment of the present specification.

FIG. 13 is a diagram illustrating a method for displaying a control indicator based on an object property of a control object in accordance with one embodiment of the present specification.

The display device 100 may display a control indicator if a control object is moved from a first private region 1310-1 to a public region 1320. At this time, for example, the display device 100 may set a display method of the control indicator differently based on an object property of the control object. In more detail, if an object property of the control object is a private property, the display device 100 may display a first control indicator 1340 in the first private region 1310-1. At this time, the first control indicator 1340 may be the indicator that indicates that the control object 1330-1 having a private property is located in the public region 1320. Also, for example, the private property may be the property that allows an access authority for the first user 230-1. As a result, the first user 230-1 may identify that the control object 1330-1, which allows an access authority for the first user 230-1, is located in the public region 1320.

For another example, if the object property of the control object is a public property, the display device 100 may display a second control indicator 1350-1 in the first private region 1310-1. At the same time, the display device 100 may display a third control indicator 1350-2 in a second private region 1310-2. In other words, if the control object 1330-2 having a public property is located in the public region 1320, the display device 100 may display the control indicators 1350-1 and 1350-2 in all the private region 1310-1 and 1310-2 that use the display device 100. As a result, the display device 100 may provide the users with information of the control object 1330-2 that may be used. At this time, for example, if the control object 1330-2 having a public property is moved to the second private region 1310-2, the display device 100 may end display of the control indicator 1350-1 and 1350-2.

Figure 14:
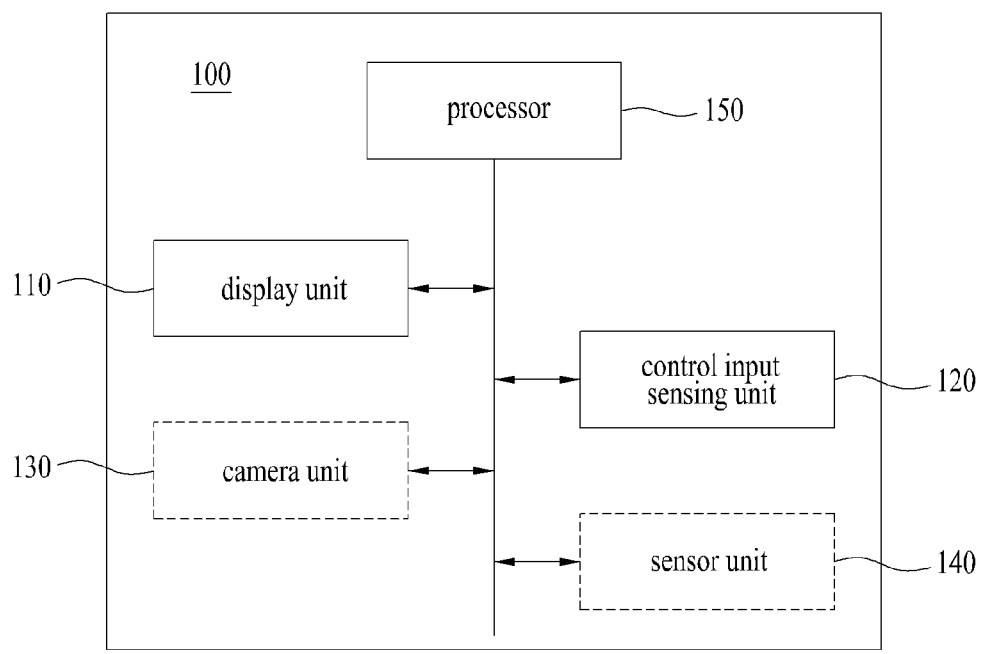
FIG. 14 is a block diagram illustrating a display device according to one embodiment of the present specification.

FIG. 14 is a block diagram illustrating a display device according to one embodiment of the present specification.

The display device 100 may include a display unit 110, a control input sensing unit 120, and a processor 150. Also, the display device 100 may further include a camera unit 130. Also, the display device 100 may further include a sensor unit 140.

The display unit 110 may be controlled by the processor 150. At this time, the display unit 110 may include a private region and a public region. Also, for example, the display unit 110 may further include an ending region. At this time, as described above, the private region may be the region to which an access authority of the user is restricted. In other words, the private region is the region set to be used by a specific user only as described above. Also, the public region may be the region other than the private region. At this time, the public region may be the region to which an access authority is allowed for all the users. Also, the editing region may be the region where a control method of a control object is set differently. In more detail, the editing region may be the region included in the private region. At this time, if the control object is located in the editing region of the private region, the display device 100 may control the control object based on the editing mode. At this time, if the control object is located in the region of the private region, which is not the editing region, the display device 100 may control the control object based on the indicating mode. In other words, the display device 100 may control the control object differently based on the location where the control object of the display unit 110 is displayed. At this time, the control object is visual information displayed in the display unit 110, and may be at least one of a user interface, an application, an icon and a file. Also, the control object may be the object displayed in the display unit 110 and controlled by the user, and is not limited to the aforementioned embodiment.

The display unit 110 may further include a buffer region. At this time, for example, the buffer region may be the region located between the private region and the public region. Also, for example, the buffer region may be a buffer line. In more detail, the display device 100 may set a boundary between the private region and the public region as the buffer line. In other words, the display device 100 may include a buffer line, which does not have a certain size, as a boundary between the private region and the public region. At this time, if the display device 100 moves a control object having a private property from the private region to the public region, the display device 100 may stop the control object in the buffer region or the buffer line as described above.

Also, for example, the display unit 110 may be a large display unit. In more detail, the display unit 110 may be a large display unit 110 which is large to be used by a plurality of users. Also, in accordance with one embodiment of the present specification, the display unit 110 is divided into a plurality of regions even though the display unit 110 includes a small display region, and may be a device that controls a control object differently based on the regions and is not limited to the aforementioned embodiment.

The control input sensing unit 120 may deliver a user input or an environment recognized by the device to the processor 150 by using at least sensor provided in the display device 100. In more detail, the control input sensing unit 120 may sense a control input of the user by using at least one sensor provided in the display device 100. In this case, at least one sensing means may include various sensing means for sensing a control input, such as a touch sensor, a fingerprint sensor, a motion sensor, a proximity sensor, an illumination sensor, a voice recognition sensor, and a pressure sensor. The control input sensing unit 120 refers to the aforementioned various sensing means, and the aforementioned sensors may be included in the device as separate elements, or may be incorporated into at least one element and included in the device. In other words, the control input sensing unit 120 may be the unit that senses a control input of the user, and is not limited to the aforementioned embodiment. Also, the control input sensing unit 120 may detect a multi-control input. In more detail, the control input sensing unit 120 may detect a plurality of control inputs input by a plurality of users. At this time, for example, the processor 150 may include a plurality of control input sensing units 120, and may sense the control input based on a region of the display unit 110. In other words, the processor 150 may use the control input based on region information and control input sensing information. As a result, the display device 100 may detect the control inputs for a plurality of users. Also, for example, the control input may be a gesture input, and may include contact or non-contact based various inputs. Also, the control input may be the input which is input by an input device or an input which is input through voice or audio, and is not limited to the aforementioned embodiment.

Also, for example, the control input sensing unit 120 may be an element integrated with the display unit 110. For example, the display unit 110 may be a touch sensitive display unit 110.

The display device 100 may include the camera unit 130 optionally. In this case, the camera unit 130 may sense and capture an image. Also, for example, the display device 100 may detect the user by using the camera unit 130. Also, for example, the display device 100 may detect a location of eyes of the user by using the camera unit 130. In more detail, the display device 100 may detect the location of the display unit 110 where eyes of the user reach, by using the camera unit 130. At this time, the display device 100 may set the private region based on the location of eyes of the user. Also, the display device 100 may further detect the distance from the display device 100 to the user by using the camera unit 130. At this time, for example, the display device 100 may set a display method of the control object differently based on the distance from the display device 100 to the user, as described with reference to FIG. 9. Also, for example, the display device 100 may sense the arm length of the user by using the camera unit 130. In other words, the camera unit 130 may sense a gesture of the user and an operation range of the user. At this time, the display device 100 may set the private region based on the arm length of the user. At this time, for example, the camera unit 130 may include at least one of an infrared sensor, an ultrasonic sensor, a proximity sensor, and an illumination sensor. In other words, the camera unit 130 may include a sensor that may detect the distance to the user or the presence of the user, and is not limited to the aforementioned embodiment.

The display device 100 may further include the sensor unit 140 optionally. At this time, the sensor unit 140 may be the unit included in the aforementioned camera unit 130. Also, for example, the display device 100 may detect the user by using the sensor unit 140. Also, for example, the display device 100 may detect the location of eyes of the user by using the sensor unit 140. Also, for example, the display device 100 may detect the distance from the display device 100 to the user by using the sensor unit 140. In other words, the display device 100 may include a separate unit separately from the camera unit 130 to detect the distance from the display device 100 to the user or the presence of the user. At this time, the sensor unit may include at least one of an infrared sensor, a proximity sensor, an ultrasonic sensor, and an illumination sensor. In other words, the sensor unit may be a sensor that senses the distance, and is not limited to the aforementioned embodiment. Also, as one example, the camera unit 110 and the sensor unit 140 may be configured as one integrated element, and are not limited to the aforementioned embodiment.

The processor 150 may be a unit that controls at least one of the display unit 100 and the control input sensing unit 120. Also, for example, the processor 150 may be a unit that further controls at least one of the camera unit 130 and the sensor unit 140. In more detail, the processor 150 may display the control object in at least one of the private region and the public region of the display unit 110. At this time, if the control object is displayed in the private region, the processor 150 may detect a control input by using the control input sensing unit 120. The processor 150 may control the control object based on the detected control input. In more detail, the processor 150 may move the control object displayed in the display unit 110 from the private region to the public region based on the control input. At this time, the processor 150 may set a moving mode of the control object differently in accordance with an object property of the control object. At this time, the object property may be either the private property or the public property as described above. In more detail, if an access authority of the user to the control object is limited and the control object is used based on a security level, the object property of the control object may be the private property. Also, if access to the control object is allowed for all the users, the object property of the control object may be the public property. At this time, the processor 150 may set a moving property of the control object differently based on the object property. At this time, the moving property may include a moving speed, information on stop or not, and a moving method. In more detail, if the object property of the control object is the private property, the processor 150 may stop the control object in the buffer region when the control object is moved from the private region to the buffer region. Afterwards, the processor 150 may move the control object from the buffer region to the public region, as described above. Also, if the object property of the control object is the public property, the processor 150 may not stop the control object in the buffer region even though the control object is moved from the private region to the buffer region. In other words, the processor 150 may move the control object from the private region to the public region through the buffer region without stop, as described above. Also, the processor 150 may set a control method of the control object differently based on the object property of the control object without limitation to the aforementioned embodiment.

Figure 15:
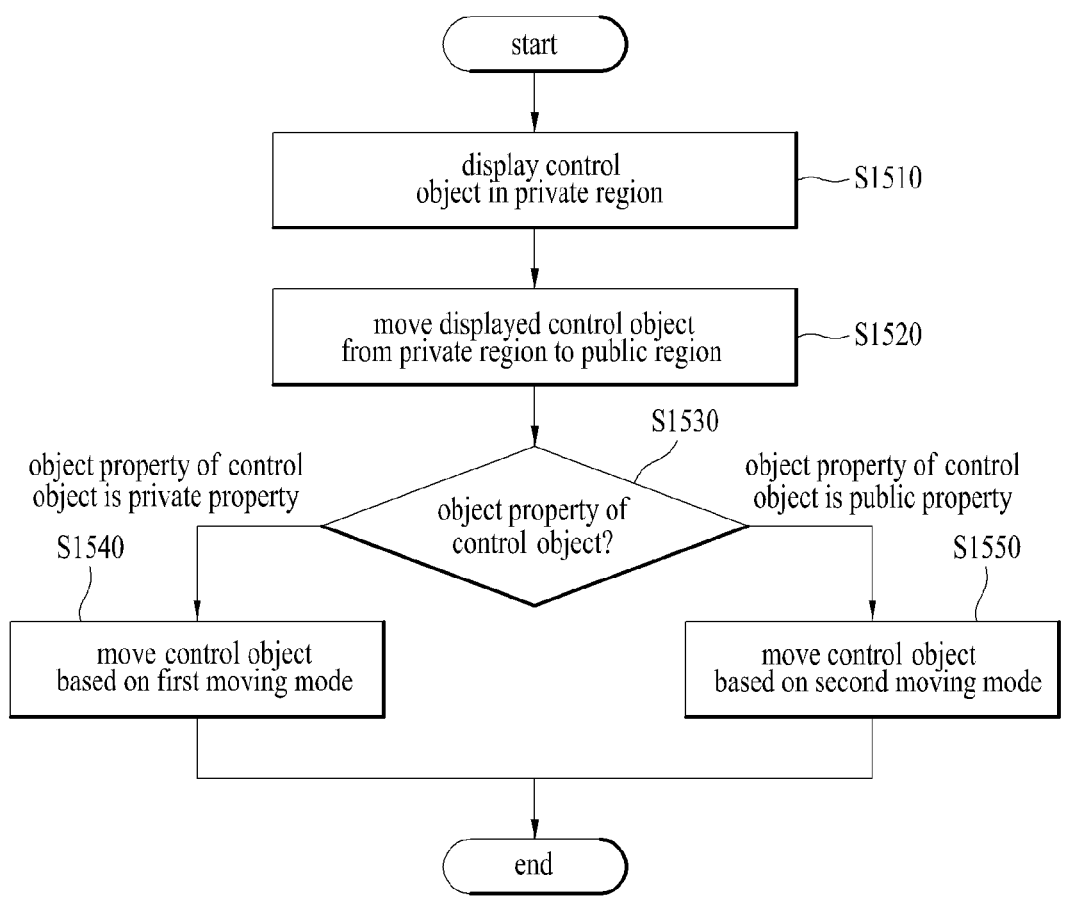
FIG. 15 is a diagram illustrating a method for controlling a display device in accordance with one embodiment of the present specification.

FIG. 15 is a diagram illustrating a method for controlling a display device in accordance with one embodiment of the present specification.

The display device 100 may display the control object in the private region (S1510). At this time, as described with reference to FIG. 1, the control object may be at least one of a user interface, an application, an icon, and a file. In more detail, the control object may be visual information controlled by the user of the display device 100 and displayed in the display unit 110 to implement an operation. Also, the display device 100 may include the private region and a public region. At this time, the private region may be the region set based on the user. In more detail, the private region may be a region of the display unit 110 of the display device 100, wherein the region may be used by a specific user only. Also, the public region may be the region other than the private region of the display unit.

Next, the display device 100 may move the displayed control object from the private region to the public region (S1520). At this time, as described with reference to FIG. 3, the display device 100 may detect the first control input. At this time, the first control input may be a touch input, a gesture input, etc. In more detail, the display device 100 may move the control object from the private region to the public region based on the detected first control input.

Next, the display device 100 may determine an object property of the control object (S1530). As described with reference to FIG. 2, the control object may have a private property as the object property. Alternatively, the control object may have a public property as the object property. At this time, for example, the display device 100 may set the object property based on an access authority of the user. In more detail, the display device 100 may set the property allowed for the user to access the control object as the private property. In other words, the display device 100 may allow the allowed user only to use the control object having a private property based on a predetermined reference. Also, the display device 100 may set the property used by all users who use the display device 100 as the public property. In other words, the public property may mean the object property that may be used regardless of the user. Also, for example, the display device 100 may set the object property based on a security level. In more detail, the display device 100 may set the public property as the property having the lowest security level. At this time, the display device 100 may set security of the object at low level to be accessed by all the users. Also, the display device 100 may set the object having a first private property and a second private property based on the security level. At this time, the first private property may be the object property having a security level higher than that of the second private property.

Next, the display device 100 may move the control object based on a first moving mode (S1540). Also, the display device 100 may move the control object based on a second moving mode (S1550). At this time, as described with reference to FIG. 3, the first moving mode and the second moving mode may be modes of which moving properties are different from each other. At this time, for example, the moving property may include a moving speed, information on stop or not, and a moving method, as described later with reference to FIG. 16.

Figure 16:
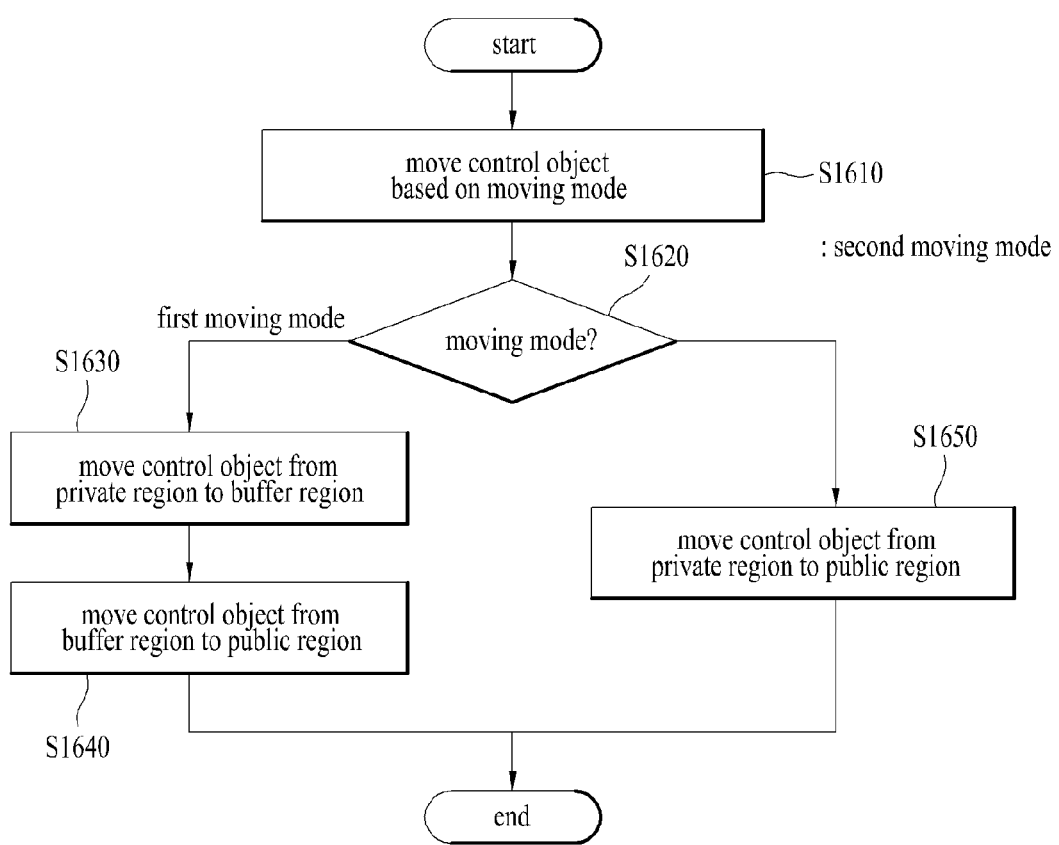
FIG. 16 is a diagram illustrating another method for controlling a display device in accordance with one embodiment of the present specification.

FIG. 16 is a diagram illustrating another method for controlling a display device in accordance with one embodiment of the present specification. The display device 100 may move the control object based on the moving mode (S1610). At this time, as described with reference to FIG. 2, the display device 100 may set the moving mode differently based on the object property of the control object. If the object property of the control object is the private property, the display device 100 may move the control object based on the first moving mode. Also, if the object property of the control object is the public property, the display device 100 may move the control object based on the second moving mode.

Next, the display device 100 may detect the moving mode (S1620). At this time, as described with reference to FIG. 3, the first moving mode may have a moving property different from that of the second moving mode. At this time, the moving property may include a moving speed, information on stop or not, and a moving method. The display device 100 may set the moving method of the control object based on the object property of the control object.

Next, if the display device 100 moves the control object based on the first moving mode, the display device 100 may move the control object from the private region to the buffer region (S1630). As described with reference to FIG. 3, the control object may be moved from the private region to the buffer region based on the first control input. At this time, the display device 100 may stop the control object in the buffer region. In other words, the control object having a private property may be stopped in the buffer region. At this time, the buffer region may be a buffer line, as described with reference to FIG. 7. The display device 100 may stop the control object in the buffer region for a predetermined reference time.

Next, the display device 100 may move the control object from the buffer region to the public region (S1650). As described with reference to FIG. 3, the display device 100 may move the control object from the buffer region to the public region if the predetermined reference time passes. Also, as described with reference to FIG. 4, the display device 100 may detect a second control input in a state that the control object is stopped in the buffer region. At this time, the second control input may be the input that moves the control object from the buffer region to the public region. Also, the display device 100 may detect a third control input in a state that the control object is stopped in the buffer region. At this time, the third control input may be the input that moves the control object from the buffer region to the private region.

Next, if the display device 100 moves the control object based on the second moving mode, the display device 100 may move the control object from the first private region to the public region (S1650). As described with reference to FIG. 3, if the display device 100 detects the first control input, the control object may be moved from the private region to the public region through the buffer region. In more detail, if the display device 100 moves the control object based on the second moving mode unlike the first moving mode, the display device 100 may move the control object to the public region without stopping the control object in the buffer region. In other words, the control object having a public property may directly be moved from the private region to the public region. As a result, the display device 100 may set the moving method differently in accordance with the object property of the control object.

Moreover, although the description may be made for each of the drawings for convenience of description the embodiments of the respective drawings may be incorporated to achieve a new embodiment. Also, a computer readable recording medium where a program for implementing the embodiments is recorded may be designed in accordance with the need of the person skilled in the art within the scope of the present specification.

The display device and the method for controlling the same according to the present specification are not limited to the aforementioned embodiments, and all or some of the aforementioned embodiments may selectively be configured in combination so that various modifications may be made in the aforementioned embodiments.

In the meantime, the display device and the method for controlling the same according to the present specification may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, and RAM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, although the preferred embodiments of the present specification have been described, it will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A display device comprising:
  a display unit configured to display visual information, wherein the display unit includes a private region, a public region and a first buffer region located between the private region and the public region;
  a sensor configured to detect a control input and to deliver the detected control input to a processor, the processor configured to:
    display a control object in a first private region, and
    when the displayed control object is moved from the first private region to the public region, stop moving the control object in the first buffer region based on a first moving mode if an object property of the control object is a private property, and move the control object based on a second moving mode if the object property of the control object is a public property,
    wherein a moving property of the first moving mode is different from the moving property of the second moving mode.

2. The display device according to claim 1, wherein the private property allows an access authority for a limited user, and the public property allows all the users to use the display device.

3. The display device according to claim 2, wherein the processor is further configured to set a first private property and a second private property based on the access authority of the user, and
  wherein the first private property has a higher security level than that of the second private property.

4. The display device according to claim 1, wherein the processor is further configured to:
  detect a first control input when the control object is moved based on the first moving mode, and
  if the control object is moved from the first private region to the first buffer region based on the detected first control input, stop the control object in the first buffer region.

5. The display device according to claim 4, wherein the processor is further configured to:
  stop the control object in the first buffer region for a predetermined reference time, and
  move the control object from the first buffer region to the public region if the predetermined reference time has passed.

6. The display device according to claim 4, wherein the processor is further configured to move the control object from the first buffer region to the public region if a second control input is detected in a state that the control object is stopped in the first buffer region.

7. The display device according to claim 6, wherein the processor is further configured to move the control object from the first buffer region to the first private region if a third control input is detected in a state that the control object is stopped in the first buffer region.

8. The display device according to claim 1, wherein the processor is further configured to:
  detect a first control input when the control object is moved based on the second moving mode, and
  move the control object from the first private region to the public region by using the detected first control input.

9. The display device according to claim 1, wherein the processor is further configured to change the object property of the control object from the private property to the public property when the control object is moved from the first private region to the public region based on the first moving mode.

10. The display device according to claim 1, wherein the display unit further includes a second private region and a second buffer region, and
  wherein the second private region being located so as not to overlap with the first private region, and the second buffer region being located between the second private region and the public region.

11. The display device according to claim 10, wherein the processor is further configured to:
  detect a first control input and stop the control object in the second buffer region if the control object is moved from the public region to the second buffer region by the detected first control input when the control object having the private property moved from the first private region to the public region enters the second private region.

12. The display device according to claim 11, wherein the processor is further configured to stop the control object in the second buffer region for a predetermined reference time, and move the control object from the second buffer region to the second private region if the predetermined reference time passes.

13. The display device according to claim 10, wherein the processor is further configured to move the control object from the second buffer region to the second private region if a second control input is detected in a state that the control object is stopped in the second buffer region.

14. The display device according to claim 10, wherein the processor is further configured to:
detect a first control input and move the control object from the public region to the second private region by using the detected first control input when the control object having the public property moved from the first private region to the public region enters the second private region.

15. The display device according to claim 10, wherein the processor is further configured to display a control indicator corresponding to the control object if the control object is moved from the first private region to the public region, and
wherein the control indicator indicating that the control object is located in the public region.

16. The display device according to claim 15, wherein the processor is further configured to:
display a first control indicator corresponding to the control object in the first private region if the object property of the control object is the private property, and
display the first control indicator corresponding to the control object in the first private region and a second control indicator corresponding to the control object in the second private region if the object property of the control object is the public property.

17. The display device according to claim 1, further comprising a camera unit configured to detect a location of eyes of a user,
wherein the processor is further configured to:
set a region with a first distance from the detected location of eyes of the user in the display device as the private region, and
set a region other than the private region within the display unit as the public region.

18. The display device according to claim 17, wherein the camera unit further detects a distance from the display device to the user, and
wherein the processor is further configured to:
display a first control object if the distance from the display device to the user exceeds a threshold distance, and
display the first control object and a second control object if the distance from the display device to the user is within the threshold distance,
wherein the object property of the first control object is the public property, and the object property of the second control object is the private property.

19. A method for controlling a display device, the method comprising:
displaying a control object in a first private region;
moving the displayed control object from the first private region to a public region;
stopping moving the control object in a first buffer region located between the first private region and the public region based in a first moving mode if an object property of the control object is a private property; and
moving the control object based in a second moving mode if the object property of the control object is a public property,
wherein a moving property of the first moving mode is different from the moving property of the second moving mode.

* * * * *